US010922930B2

(12) United States Patent
Cantley et al.

(10) Patent No.: US 10,922,930 B2
(45) Date of Patent: *Feb. 16, 2021

(54) SYSTEM FOR PROVIDING ON-DEMAND RESOURCE DELIVERY TO RESOURCE DISPENSERS

(71) Applicant: Bank of America Corporation, Charlotte, NC (US)

(72) Inventors: Kerry Michelle Cantley, Fort Mill, SC (US); David Joseph Koval, Charlotte, NC (US); Kristy Lynn Monk, Charlotte, NC (US); Keith Dion Owes, Bordentown, NJ (US); Brett C. Carter, Huntersville, NC (US); James Wayland Pierce, Jr., Cornelius, NC (US); John Zemaitis, Charlotte, NC (US); Kim Leah Bunn, St. Johns, FL (US); Sherri Sullivan, Newark, DE (US); Matthew Joseph Wallace, Media, PA (US); Veronica Smith, The Colony, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/725,100

(22) Filed: Dec. 23, 2019

(65) Prior Publication Data

US 2020/0134984 A1 Apr. 30, 2020

Related U.S. Application Data

(63) Continuation of application No. 15/598,579, filed on May 18, 2017, now Pat. No. 10,515,518.

(51) Int. Cl.
*G07F 19/00* (2006.01)
*G06Q 10/08* (2012.01)

(52) U.S. Cl.
CPC ......... *G07F 19/209* (2013.01); *G06Q 10/083* (2013.01); *G06Q 10/087* (2013.01); *G07F 19/211* (2013.01)

(58) Field of Classification Search
CPC ... G07F 19/209; G07F 19/211; G06Q 10/087; G06Q 10/083
See application file for complete search history.

(56) References Cited

U.S. PATENT DOCUMENTS 2,612,092 A 9/1952 Heyer et al.
3,618,059 A 11/1971 Allen
(Continued)

FOREIGN PATENT DOCUMENTS

DE 4019265 C1 11/1991
DE 4429815 A1 2/1996
(Continued)

OTHER PUBLICATIONS

Palshikar et al., Analytics for Detection of Money Laundering, TACTiCS, TCS Technical Architects' Conference 2014, pp. 2-9 Year: 2014), 10 pages.
(Continued)

*Primary Examiner* — Peter Ludwig
*Assistant Examiner* — Michael Jared Walker
(74) *Attorney, Agent, or Firm* — Michael A. Springs; Moore & Van Allen PLLC; Nicholas C. Russell

(57) ABSTRACT

Embodiments of the present invention provide a system for managing and/or operating a nodal grid network in which resources are received, dispensed, and transferred throughout the nodal grid network. The nodal network may comprise automated teller machines, merchant stores, delivery vehicles, processing centers, and the like. The system scans resource notes for important and sometimes unique information as the resource notes are received and/or dispensed
(Continued)

at each of the nodes. This information about the resource notes and the nodes of the network can be recorded and stored in real-time, such that the system can make real-time decisions regarding how to address any necessary adjustments of resource quantities at each node. Furthermore, historical nodal data can be analyzed to identify trends at each node, and this historical data can be extrapolated to provide insight into an expected health of each node at future points in time.

17 Claims, 7 Drawing Sheets

(56) References Cited

U.S. PATENT DOCUMENTS

| | | |
|---|---|---|
| 3,767,080 A | 10/1973 | Erickson |
| 4,113,140 A | 9/1978 | Graef et al. |
| 4,186,477 A | 2/1980 | Bunch et al. |
| 4,313,601 A | 2/1982 | Graef et al. |
| 4,352,097 A | 9/1982 | Hamann |
| 4,369,360 A | 1/1983 | Tsuji |
| 4,443,692 A | 4/1984 | Nishimura |
| 4,622,456 A | 11/1986 | Naruto et al. |
| 4,784,274 A | 11/1988 | Mori et al. |
| 4,802,325 A | 2/1989 | Duncan |
| 4,820,909 A | 4/1989 | Kawauchi et al. |
| 4,910,944 A | 3/1990 | Segalowitz et al. |
| 4,992,648 A | 2/1991 | Hutchinson |
| 5,022,531 A | 6/1991 | Horino et al. |
| 5,340,967 A | 8/1994 | Martin et al. |
| 5,411,249 A | 5/1995 | Zouzoulas |
| 5,453,601 A | 9/1995 | Rosen |
| 5,529,208 A | 6/1996 | Carstens et al. |
| 5,533,605 A | 7/1996 | Mays et al. |
| 5,561,281 A | 10/1996 | Eda et al. |
| 5,606,157 A | 2/1997 | Awatsu et al. |
| 5,680,472 A | 10/1997 | Conant |
| 5,689,240 A | 11/1997 | Traxler |
| 5,740,271 A | 4/1998 | Kunkler et al. |
| 5,748,906 A | 5/1998 | Sandig |
| 5,748,908 A | 5/1998 | Yu |
| 5,813,510 A | 9/1998 | Rademacher |
| 5,900,607 A | 5/1999 | Awatsu et al. |
| 5,931,634 A | 8/1999 | Neri |
| 5,936,220 A | 8/1999 | Hoshino et al. |
| 5,952,639 A | 9/1999 | Ohki et al. |
| 5,952,920 A | 9/1999 | Braddick |
| 5,953,423 A | 9/1999 | Rosen |
| 5,963,131 A | 10/1999 | D'angelo et al. |
| 5,996,314 A | 12/1999 | Pennini et al. |
| 6,014,649 A | 1/2000 | Kobayashi et al. |
| 6,021,397 A | 2/2000 | Jones et al. |
| 6,028,517 A | 2/2000 | Sansone et al. |
| 6,047,807 A | 4/2000 | Molbak |
| 6,055,438 A | 4/2000 | Winner |
| 6,065,672 A | 5/2000 | Haycock |
| 6,082,519 A | 7/2000 | Martin et al. |
| 6,109,522 A | 8/2000 | Force et al. |
| 6,122,625 A | 9/2000 | Rosen |
| 6,167,378 A | 12/2000 | Webber, Jr. |
| 6,260,024 B1 | 7/2001 | Shkedy |
| 6,278,795 B1 | 8/2001 | Anderson et al. |
| 6,363,164 B1 | 3/2002 | Jones et al. |
| 6,378,770 B1 | 4/2002 | Clark et al. |
| 6,483,433 B2 | 11/2002 | Moskowitz et al. |
| 6,487,542 B2 | 11/2002 | Ebata et al. |
| 6,491,216 B1 | 12/2002 | May |
| 6,498,603 B1 | 12/2002 | Wallace |
| 6,502,746 B1 | 1/2003 | Do et al. |
| 6,513,303 B2 | 2/2003 | Neri |
| 6,523,742 B1 | 2/2003 | Awatsu et al. |
| 6,526,273 B1 | 2/2003 | Link et al. |
| 6,550,221 B1 | 4/2003 | Neri |
| 6,550,671 B1 | 4/2003 | Brown et al. |
| 6,584,754 B1 | 7/2003 | Neri |
| 6,607,124 B1 | 8/2003 | Junkins et al. |
| 6,633,881 B2 | 10/2003 | Drobish et al. |
| 6,659,258 B2 | 12/2003 | Otsuka |
| 6,715,670 B1 | 4/2004 | Swiatek et al. |
| 6,736,314 B2 | 5/2004 | Cooper et al. |
| 6,788,203 B1 | 9/2004 | Roxbury et al. |
| 6,845,905 B2 | 1/2005 | Blad et al. |
| 6,848,612 B2 | 2/2005 | Uematsu et al. |
| 6,922,973 B1 | 8/2005 | Hofmann et al. |
| 6,934,688 B2 | 8/2005 | Carter |
| 6,983,836 B2 | 1/2006 | Adams et al. |
| 7,004,385 B1 | 2/2006 | Douglass |
| 7,042,360 B2 | 5/2006 | Light et al. |
| 7,076,458 B2 | 7/2006 | Lawlor et al. |
| 7,121,461 B2 | 10/2006 | Washington et al. |
| 7,149,336 B2 | 12/2006 | Jones et al. |
| 7,201,313 B1 | 4/2007 | Ramachandran |
| 7,212,992 B1 | 5/2007 | Kanevsky et al. |
| 7,216,800 B1 | 5/2007 | Ramachandran |
| 7,219,083 B2 | 5/2007 | Bellucci et al. |
| 7,232,024 B2 | 6/2007 | Mazur et al. |
| 7,243,080 B2 | 7/2007 | Bhadra |
| 7,248,160 B2 | 7/2007 | Mangan et al. |
| 7,269,279 B2 | 9/2007 | Chiles |
| 7,284,692 B1 | 10/2007 | Douglass |
| 7,334,381 B2 | 2/2008 | Mertz, II et al. |
| 7,347,358 B2 | 3/2008 | Ireland et al. |
| 7,348,886 B2 | 3/2008 | Himberger et al. |
| 7,350,230 B2 | 3/2008 | Forrest |
| 7,357,303 B2 | 4/2008 | Taniyama et al. |
| 7,375,638 B2 | 5/2008 | Light et al. |
| 7,461,780 B2 | 12/2008 | Potts et al. |
| 7,474,217 B2 | 1/2009 | Himberger et al. |
| 7,513,417 B2 | 4/2009 | Burns et al. |
| 7,513,419 B1 | 4/2009 | Crews et al. |
| 7,516,601 B2 | 4/2009 | Horiuchi |
| 7,537,153 B2 | 5/2009 | Hurwitz et al. |
| 7,559,183 B2 | 7/2009 | Bell |
| 7,577,612 B2 | 8/2009 | Waller et al. |
| 7,588,185 B2 | 9/2009 | Berquist et al. |
| 7,599,543 B2 | 10/2009 | Jones et al. |
| 7,600,692 B2 | 10/2009 | Call et al. |
| 7,602,956 B2 | 10/2009 | Jones et al. |
| 7,623,033 B2 | 11/2009 | Ainsworth et al. |
| 7,650,231 B2 | 1/2010 | Gadler |
| 7,659,816 B2 | 2/2010 | Wandel |
| 7,669,757 B1 | 3/2010 | Crews et al. |
| 7,714,708 B2 | 5/2010 | Brackmann et al. |
| 7,719,423 B2 | 5/2010 | Himberger et al. |
| 7,748,610 B2 | 7/2010 | Bell et al. |
| 7,778,456 B2 | 8/2010 | Jones et al. |
| 7,780,074 B1 | 8/2010 | Crews et al. |
| 7,900,829 B1 | 3/2011 | Folk et al. |
| 7,903,863 B2 | 3/2011 | Jones et al. |
| 7,908,188 B2 | 3/2011 | Flynn et al. |
| 7,965,184 B1 | 6/2011 | Nichols et al. |
| 7,982,604 B2 | 7/2011 | Nichols et al. |
| 7,982,610 B1 | 7/2011 | Nichols et al. |
| 8,056,305 B1 | 11/2011 | Folk et al. |
| 8,078,534 B1 | 12/2011 | Nichols et al. |
| 8,094,021 B2 | 1/2012 | Nichols et al. |
| 8,141,772 B1 | 3/2012 | Folk et al. |
| 8,276,810 B2 | 10/2012 | Cole et al. |
| 8,341,077 B1 | 12/2012 | Nichols et al. |
| 8,396,278 B2 | 3/2013 | Jones et al. |
| 8,430,303 B1 | 4/2013 | Sanders et al. |
| 8,459,540 B2 | 6/2013 | Brindley et al. |
| 8,469,262 B2 | 6/2013 | Mon et al. |
| 8,523,235 B2 | 9/2013 | Kwak et al. |
| 8,550,338 B1 | 10/2013 | Nichols et al. |
| 8,556,167 B1 | 10/2013 | Nichols et al. |
| 8,567,664 B2 | 10/2013 | Goodwin et al. |
| 8,571,948 B1 | 10/2013 | Nichols et al. |
| 8,577,802 B1 | 11/2013 | Nichols et al. |
| 8,600,842 B1 | 12/2013 | Sanders et al. |
| 8,601,771 B2 | 12/2013 | Folk et al. |
| 8,655,045 B2 | 2/2014 | Jones et al. |

(56) References Cited

U.S. PATENT DOCUMENTS

| | | |
|---|---|---|
| 8,657,187 B1 | 2/2014 | Li et al. |
| 8,844,804 B2 | 9/2014 | Blachowicz et al. |
| 8,897,741 B2 | 11/2014 | Johnson |
| 8,924,262 B2 | 12/2014 | Shuster |
| 8,972,297 B2 | 3/2015 | Kay et al. |
| 9,004,352 B1 | 4/2015 | Graef et al. |
| 9,024,722 B2 | 5/2015 | Nichols et al. |
| 9,058,626 B1 | 6/2015 | Donaho et al. |
| 9,141,876 B1 | 9/2015 | Jones et al. |
| 9,171,316 B2 | 10/2015 | Walker et al. |
| 9,218,586 B2 | 12/2015 | Ozkan |
| 9,219,660 B2 | 12/2015 | Sanches |
| 9,245,289 B2 | 1/2016 | Ballaro et al. |
| 9,311,671 B2 | 4/2016 | Folk et al. |
| 9,412,114 B2 | 8/2016 | Meek et al. |
| 9,495,705 B2 | 11/2016 | Blachowicz et al. |
| 9,565,074 B2 | 2/2017 | Lehane et al. |
| 9,639,874 B2 | 5/2017 | Psota et al. |
| 9,640,041 B2 | 5/2017 | Block et al. |
| 9,773,282 B1 | 9/2017 | Haffey et al. |
| 10,496,964 B2 | 12/2019 | Zimmerman et al. |
| 10,504,077 B1 | 12/2019 | Hu et al. |
| 2001/0020638 A1 | 9/2001 | Uematsu et al. |
| 2001/0042785 A1 | 11/2001 | Walker et al. |
| 2001/0051922 A1 | 12/2001 | Waller et al. |
| 2001/0054643 A1 | 12/2001 | Siemens |
| 2002/0052193 A1 | 5/2002 | Chetty |
| 2002/0052794 A1 | 5/2002 | Bhadra |
| 2002/0082994 A1 | 6/2002 | Herziger |
| 2002/0091937 A1 | 7/2002 | Ortiz |
| 2002/0095588 A1 | 7/2002 | Shigematsu et al. |
| 2002/0111916 A1 | 8/2002 | Coronna et al. |
| 2002/0120572 A1 | 8/2002 | Bellucci et al. |
| 2002/0138424 A1 | 9/2002 | Coyle |
| 2002/0194122 A1 | 12/2002 | Knox et al. |
| 2002/0195309 A1 | 12/2002 | Pope |
| 2003/0004870 A1 | 1/2003 | Van Rensburg et al. |
| 2003/0011466 A1 | 1/2003 | Samuel et al. |
| 2003/0050891 A1 | 3/2003 | Cohen |
| 2003/0061153 A1 | 3/2003 | Birdsong et al. |
| 2003/0083936 A1 | 5/2003 | Mueller et al. |
| 2003/0083969 A1 | 5/2003 | Uchiyama et al. |
| 2003/0122671 A1 | 7/2003 | Jespersen |
| 2003/0163710 A1 | 8/2003 | Ortiz et al. |
| 2003/0177102 A1 | 9/2003 | Robinson |
| 2003/0208431 A1 | 11/2003 | Raynes et al. |
| 2003/0213843 A1 | 11/2003 | Jackson |
| 2003/0234719 A1 | 12/2003 | Denison et al. |
| 2003/0236589 A1 | 12/2003 | Myatt |
| 2003/0236748 A1 | 12/2003 | Gressel et al. |
| 2004/0016796 A1 | 1/2004 | Hanna et al. |
| 2004/0056767 A1 | 3/2004 | Porter |
| 2004/0069591 A1 | 4/2004 | Ito |
| 2004/0083149 A1 | 4/2004 | Jones |
| 2004/0100379 A1 | 5/2004 | Boman et al. |
| 2004/0111346 A1 | 6/2004 | Macbeath et al. |
| 2004/0117302 A1 | 6/2004 | Weichert et al. |
| 2004/0124966 A1 | 7/2004 | Forrest |
| 2004/0201454 A1 | 10/2004 | Waterhouse et al. |
| 2004/0215566 A1 | 10/2004 | Meurer |
| 2004/0217162 A1 | 11/2004 | Chigira et al. |
| 2005/0011721 A1 | 1/2005 | Armanini et al. |
| 2005/0027594 A1 | 2/2005 | Yasnovsky et al. |
| 2005/0080731 A1 | 4/2005 | Dnyaneshwar |
| 2005/0091129 A1 | 4/2005 | Tien |
| 2005/0096986 A1 | 5/2005 | Taylor et al. |
| 2005/0108164 A1 | 5/2005 | Salafia et al. |
| 2005/0171797 A1 | 8/2005 | Abigail |
| 2005/0183928 A1 | 8/2005 | Jones et al. |
| 2005/0189266 A1 | 9/2005 | Fujita et al. |
| 2005/0258234 A1 | 11/2005 | Silverbrook et al. |
| 2005/0273347 A1 | 12/2005 | Dudley et al. |
| 2005/0284728 A1 | 12/2005 | Corrick et al. |
| 2006/0022032 A1 | 2/2006 | Fillinger et al. |
| 2006/0026017 A1 | 2/2006 | Walker |
| 2006/0120519 A1 | 6/2006 | Tamari et al. |
| 2006/0131395 A1 | 6/2006 | Potts et al. |
| 2006/0206246 A1 | 9/2006 | Walker |
| 2006/0212372 A1 | 9/2006 | Eberhard et al. |
| 2006/0247973 A1 | 11/2006 | Mueller et al. |
| 2006/0271441 A1 | 11/2006 | Mueller et al. |
| 2006/0282277 A1 | 12/2006 | Ng |
| 2006/0288233 A1 | 12/2006 | Kozlay |
| 2007/0005452 A1 | 1/2007 | Klingenberg et al. |
| 2007/0008118 A1 | 1/2007 | Kassiedass |
| 2007/0012602 A1 | 1/2007 | Baldassari et al. |
| 2007/0034683 A1 | 2/2007 | Eastman et al. |
| 2007/0038560 A1 | 2/2007 | Ansley |
| 2007/0045395 A1 | 3/2007 | Corona et al. |
| 2007/0063016 A1 | 3/2007 | Myatt et al. |
| 2007/0100750 A1 | 5/2007 | Hartfield et al. |
| 2007/0102439 A1 | 5/2007 | Bell |
| 2007/0106582 A1 | 5/2007 | Baker et al. |
| 2007/0109097 A1 | 5/2007 | Coutermarsh et al. |
| 2007/0151827 A1 | 7/2007 | Brandstrom et al. |
| 2007/0174156 A1 | 7/2007 | Emde et al. |
| 2007/0187485 A1 | 8/2007 | Aas et al. |
| 2007/0198341 A1 | 8/2007 | Park |
| 2007/0226142 A1 | 9/2007 | Hanna et al. |
| 2007/0228151 A1 | 10/2007 | Yokoi et al. |
| 2007/0282724 A1 | 12/2007 | Barnes et al. |
| 2008/0005019 A1 | 1/2008 | Hansen |
| 2008/0005578 A1 | 1/2008 | Shafir |
| 2008/0029949 A1 | 2/2008 | Hansson |
| 2008/0103959 A1 | 5/2008 | Carroll et al. |
| 2008/0116259 A1 | 5/2008 | Oberan |
| 2008/0120237 A1 | 5/2008 | Lin |
| 2008/0126515 A1 | 5/2008 | Chambers et al. |
| 2008/0134849 A1 | 6/2008 | McGough |
| 2008/0149706 A1 | 6/2008 | Brown et al. |
| 2008/0155269 A1 | 6/2008 | Yoshikawa |
| 2008/0158002 A1 | 7/2008 | Parkinson et al. |
| 2008/0199155 A1 | 8/2008 | Hagens et al. |
| 2008/0223930 A1 | 9/2008 | Rolland et al. |
| 2008/0236101 A1 | 10/2008 | Horiuchi |
| 2008/0249934 A1 | 10/2008 | Purchase et al. |
| 2008/0262949 A1 | 10/2008 | Bond et al. |
| 2008/0265019 A1 | 10/2008 | Artino et al. |
| 2008/0303903 A1 | 12/2008 | Bentley et al. |
| 2009/0001158 A1 | 1/2009 | Walters |
| 2009/0006249 A1 | 1/2009 | Morgan et al. |
| 2009/0006250 A1 | 1/2009 | Bixler et al. |
| 2009/0032580 A1 | 2/2009 | Blachowicz et al. |
| 2009/0034802 A1 | 2/2009 | Frei et al. |
| 2009/0051566 A1 | 2/2009 | Olsen et al. |
| 2009/0051769 A1 | 2/2009 | Kuo et al. |
| 2009/0065573 A1 | 3/2009 | Potts et al. |
| 2009/0107800 A1 | 4/2009 | Nishida et al. |
| 2009/0114716 A1 | 5/2009 | Ramachandran |
| 2009/0140039 A1 | 6/2009 | Force et al. |
| 2009/0164364 A1 | 6/2009 | Galit et al. |
| 2009/0169053 A1 | 7/2009 | Vendrig |
| 2009/0187482 A1 | 7/2009 | Blount et al. |
| 2009/0216662 A1 | 8/2009 | Crist et al. |
| 2009/0242626 A1 | 10/2009 | Jones et al. |
| 2010/0052844 A1 | 3/2010 | Wesby |
| 2010/0076853 A1 | 3/2010 | Schwarz |
| 2010/0116619 A1 | 5/2010 | Jones |
| 2010/0127070 A1 | 5/2010 | Sanders et al. |
| 2010/0131407 A1 | 5/2010 | Folk et al. |
| 2010/0274723 A1 | 10/2010 | Joao |
| 2011/0258090 A1 | 10/2011 | Bosch et al. |
| 2011/0276396 A1 | 11/2011 | Rathod |
| 2012/0030109 A1 | 2/2012 | Dooley et al. |
| 2012/0077476 A1 | 3/2012 | Paraskevakos et al. |
| 2012/0101925 A1 | 4/2012 | Leibon et al. |
| 2012/0124496 A1 | 5/2012 | Rose et al. |
| 2013/0044934 A1 | 2/2013 | Tolene |
| 2013/0148874 A1 | 6/2013 | Jones et al. |
| 2013/0232064 A1 | 9/2013 | Bosch |
| 2013/0275243 A1 | 10/2013 | Ramaratnam et al. |
| 2013/0290172 A1 | 10/2013 | Mashinsky |
| 2013/0311355 A1 | 11/2013 | Chirehdast |
| 2014/0067661 A1 | 3/2014 | Elischer |

(56) References Cited

U.S. PATENT DOCUMENTS

| | | | |
|---|---|---|---|
| 2014/0166745 A1 | 6/2014 | Graef et al. |
| 2014/0305352 A1 | 10/2014 | Dowling et al. |
| 2014/0337211 A1 | 11/2014 | Crist et al. |
| 2014/0339301 A1 | 11/2014 | Angus et al. |
| 2015/0051731 A1 | 2/2015 | Neilan |
| 2015/0095203 A1 | 4/2015 | Howe |
| 2015/0095240 A1 | 4/2015 | Specogna et al. |
| 2015/0098642 A1 | 4/2015 | Jacomet et al. |
| 2015/0101906 A1 | 4/2015 | George et al. |
| 2015/0170260 A1 | 6/2015 | Lees et al. |
| 2015/0178670 A1 | 6/2015 | Angus et al. |
| 2015/0186886 A1 | 7/2015 | Schwalb et al. |
| 2015/0186905 A1 | 7/2015 | Blakeslee et al. |
| 2016/0173364 A1 | 6/2016 | Pitio et al. |
| 2016/0210626 A1 | 7/2016 | Ortiz et al. |
| 2016/0350727 A1 | 12/2016 | Heit et al. |
| 2017/0039551 A1 | 2/2017 | Driggs et al. |
| 2017/0200152 A1 | 7/2017 | Winkler et al. |
| 2017/0359229 A1 | 12/2017 | Dintenfass et al. |
| 2017/0359245 A1 | 12/2017 | Dintenfass et al. |
| 2017/0364871 A1 | 12/2017 | Kurian |
| 2018/0047001 A1 | 2/2018 | Tiwari |
| 2018/0218323 A1 | 8/2018 | Nguyen |
| 2018/0253718 A1 | 9/2018 | Khan et al. |
| 2019/0080392 A1 | 3/2019 | Youb et al. |

FOREIGN PATENT DOCUMENTS

| | | | |
|---|---|---|---|
| DE | 19512045 A1 | 10/1996 |
| DE | 19846452 A1 | 12/1999 |
| DE | 20013021 U1 | 1/2001 |
| DE | 102004039365 A1 | 2/2006 |
| DE | 102005047711 A1 | 4/2007 |
| EP | 852279 A3 | 9/1998 |
| EP | 1477949 A1 | 11/2004 |
| EP | 1486923 B1 | 8/2017 |
| GB | 2304953 B | 8/1999 |
| JP | 2008171334 A | 7/2008 |
| WO | 9933040 A1 | 7/1999 |
| WO | 03034359 A1 | 4/2003 |
| WO | 03046842 A1 | 6/2003 |
| WO | 2005041385 A3 | 7/2005 |
| WO | 2005106722 A1 | 11/2005 |
| WO | 2005038623 A3 | 4/2007 |

OTHER PUBLICATIONS

Anonymous; "Parcel Pickup now a click away at Canada Post"; Canada Newswire; Aug. 31, 2011.
Caesar, "New Graphic Displays for the Blind", Dec. 22, 2004; Web link: http://www.physorg.com/news2474.html.
Durbin, "Ford's F-150 goes high-tech", retrieved from <http://www.wheels_ca/article/173134>, Feb. 6, 2008, 4 pages.
EHow Contributing Writer, Web link: http://www.ehow.com/how_2043858_help-blind-arrange-currency-their.html, 2 pages.
European Search Report in EP09007878 dated Oct. 1, 2009.
European Search Report in EP09007879 dated Oct. 1, 2009.
Hackman, Mark, "Hands off with Google Goggles", Dec. 8, 2009, Web link: http://www.pcmag.com/article2/0,2817,2356786,00.asp; 4 pages.
Hem, "Adaptation/Loomis cashes in on technology/The armored car company defies obsolescence despite a declining use of coins and bills", Houston Chronicle, retrieved from <http://www.chron.com/CDA/archives/archive.mpl?id=2008_4523451>, Mar. 1, 2008, 2 pages.
International Preliminary Report on Patentability for International Application No. PCT/US2010/029237 dated Oct. 13, 2011.
International Search Report and the Written Opinion of the International Searching Authority dated Jun. 2, 2010 for International Application No. PCT/US2010/029237.
International Search Report and Written Opinion for International Application No. PCT/US2007/088650, dated Sep. 16, 2008, 10 pages.
International Search Report and Written Opinion from corresponding PCT Application No. PCT/US2009/047452 dated Aug. 25, 2009.
MacDonald, Jay (Bankrate.com), "Changes to Currency May Help the Blind", Oct. 13, 2008; Web link: http://bankrate.com/finance/checking/changes-to-currency-may-help-the-blind-1.aspx; 2 pages.
MacDonald, Jay (Bankrate.com), "Changes to Currency May Help the Blind", Oct. 13, 2008; Web link: http://bankrate.com/yho/news/pf/20081013_blind_currency_changes_a2.sp; 2 pages.
Merriam Webster Website, Definition of "retrofit" retrieved from http://www.merriam-webster.com/dictionary/retrofit on Dec. 15, 2011.
Merriam Webster Website, Synonyms of "alert" retrieved from http://www.merriam-webster.com/thesaurus/alert on Dec. 15, 2011.
Monthly Minutes for RFID SIG dated Mar. 19, 2008, 2 pages.
Monthly Minutes from Banking Technology Operations Standing Committee (BTO), dated Mar. 20, 2007, 2 pages.
O'Brien, Maggie and Jordon, Steve (Omaha World-Herald), "No Single Solution to Blind-Friendly Currency", May 21, 2008, web link: http://www.acb.org/nebraska/legislation/accessible-currency/news-articles/no-single-solution-to-blind-friendly-currency.html; 5 pages.
Oracle Database SQL Reference, 10g Release 1 (10.1), Part No. B10759-01, Dec. 2003.
PCT/US09/65281, International Search Report and Written Opinion, dated Jan. 12, 2010.
Pickens, Hugh, "BrainPort Lets the Blind 'See' With Their Tongues"; Web link: http://hardware.slashdot.org/article.pl?sid=09/08/22/2035256; 3 pages.
Powerpoint Presentation, DTS Product Overview, IFS, Apr. 2006, 17 pages.
Powerpoint Presentation, Guck, "PakTrak", Cash Shipment Package Tracking Concept Overview, Draft-Version 1.0, Mar. 14, 2008, 17 pages.
Powerpoint Presentation, RFID in Banking, May 21, 2008, 12 pages.
PR_Newswire; "Airborne Express Announces New Pricing"; New York, Jan. 29, 2001.
Vicini, James (Washington, D.C.), "U.S. Court: Currency Discriminates Against the Blind", May 20, 2008, Web Link: htttp://www.reuters.com/article/idUSN2030825720080520, 3 pages.
Web link: http//www.maccast.com/2009/07/01/maccast-2009-07-01-iphone-3gs-accessibility/; 6 pages.
Web link: http://braillebookstore.com/view.php?T=Pocket+Money+Brailler, Product = Pocket Money Brailler; 2 pages.
Web link: http://en.wikipedia.org/wiki/Wired_glove [Wired Glove Information]; 3 pages.
Web link: http://www.knfbreader.com/products-mobile.php; "knfbReader Mobile", 2 pages.
Web link: http://www.reghardware.co.uk/2009/05/25/handset_apps_for_blind/print.html, Phone Apps Help Blind see(video), 2 pages.
Web link: www.abledata.com/abledata.cfm?pageid=19327&top=14673&trail=22,13134&discontinued=0, Products: Voice Output Paper Money Identifier, 2 pages.
Web link: www.halfbakery.com/idea/blind_20friendly_20currency; Blind Friendly Currency, 15 pages.
Website: http://maxiaids.com/store/prodIndex.asp?idStore=1 [Products for Independent Living: Blind & Low Vision Store]; 2 pages.
Website: http://www.snaptell.com/; 1 page.
Website: www.acb.org/resources/index.html; American Council of the Blind Helpful Resources for Blind and Visually Impaired Persons, 4 pages.
Tanaka, Global Deployment of Cash Management Solution with Core Role for Banknote-recycling ATMs, Hitachi Review (Year: 2014).

SYSTEM FOR PROVIDING ON-DEMAND RESOURCE DELIVERY TO RESOURCE DISPENSERS

CROSS-REFERENCE TO RELATED APPLICATION

This application is a continuation of and claims priority from allowed, co-pending U.S. patent application Ser. No. 15/598,579, filed on May 18, 2017 and entitled "SYSTEM FOR PROVIDING ON-DEMAND RESOURCE DELIVERY TO RESOURCE DISPENSERS," the entire disclosure of which is hereby incorporated herein by reference.

FIELD OF THE INVENTION

The present invention is generally directed to scanning, tracking, reconciling, and delivering resources throughout a nodal grid in real-time.

BACKGROUND

The present invention is generally directed to scanning, tracking, reconciling, and delivering resources throughout a nodal grid in real-time.

Managing a network or grid of devices, entities, and delivery vehicles is a complex process, particularly when quantities of resources at each network node are critical to the health of the individual nodes and the overall network. Therefore, a need exists for particular techniques of providing a resource grid system for scanning, tracking, reconciling, and delivering resources throughout a network grid of devices, entities, and delivery vehicles in real-time.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for providing on-demand resource delivery to resource dispensers. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may involve monitoring, continuously, a plurality of resource notes at a plurality of nodes across a physical geographic region, wherein monitoring comprises: (1) determining when each of the plurality of resource notes are received at each of the plurality of nodes and automatically scanning each of the plurality of resource notes for denomination data associated with each of the plurality of resource notes in real-time as they are received; (2) determining when each of the plurality of resource notes are dispensed at each of the plurality of nodes and automatically scanning each of the plurality of resource notes for the denomination data associated with each of the plurality of resource notes in real-time as they are dispensed; and (3) storing monitored data for each of the plurality of nodes in a resource grid database, wherein the monitored data comprises nodal location data, time data associated with the received and the dispensed resource notes, and the denomination data for each of the plurality of the received and the dispensed resource notes. Furthermore, the system may determine, based on the stored monitored data, that a first node of the plurality of nodes requires an adjustment of an amount of resource notes present at the first node. In response to determining that the first node requires the adjustment of the amount of resource nodes present at the first node, the system may transmit an instruction to cause a delivery vehicle to provide the adjustment to the amount of resource notes present at the first node.

In some embodiments of the system, determining that the first node of the plurality of nodes requires the adjustment of the amount of resource notes present at the first node comprises determining a trend of the amount of resource notes that are present at the first node over a period of time, determining, based on the trend, a predicted amount of the plurality of resource notes that are expected to be present at the first node at a future point in time, and determining that the predicted amount of the plurality of resource notes that are expected to be present at the first node at the future point in time is below or above a threshold amount of resource notes. In some such embodiments of the system, transmitting the instruction to cause the delivery vehicle to provide the adjustment to the amount of resource notes comprises instructions to provide the adjustment before the future point in time.

Furthermore, the some embodiments of the system may involve providing an additional amount of resource notes to be added to the first node. In some such embodiments, the system may further be configured to determine, based on the stored monitored data, that a second node of the plurality of nodes requires a reduction of an amount of resource notes present at the second node. Additionally, the system may, in response to determining that the first node requires the adjustment of the amount of resource notes present at the first node, and in response to determining that the second node requires the reduction of the amount of resource notes present at the second node, transmit an instruction to cause the delivery vehicle to reduce the amount of resource notes present at the second node and provide the additional amount of resource notes to be added to the first node.

Additionally or alternatively, the system may reduce the amount of resource notes at the first node. In some such embodiments, the system may be further configured to determine, based on the stored monitored data, that a second node of the plurality of nodes requires an addition to an amount of resource notes to the second node. Furthermore, the system may, in response to determining that the first node requires the adjustment of the amount of resource notes present at the first node, and in response to determining that the second node requires the addition to the amount of resource notes to the second node, transmit an instruction to cause the delivery vehicle to reduce the amount of resource notes at the first node and to provide the addition to the amount of resource notes to the second node.

Finally, in some embodiments of the system, each of the plurality of nodes comprise one or more automated teller machines, point of sale devices, mobile devices associated with users, delivery vehicles, or merchant locations.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
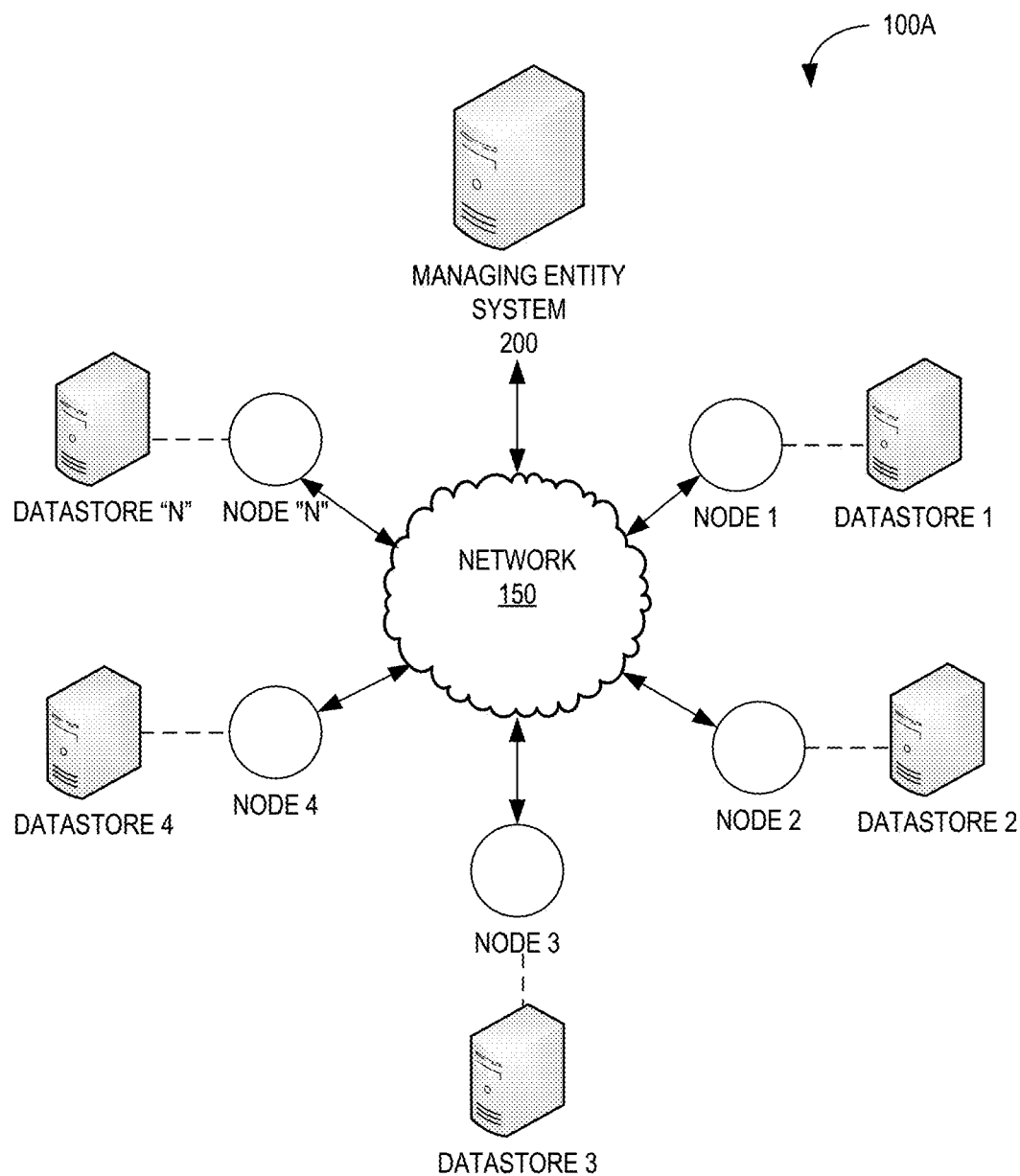
Figure 1B:
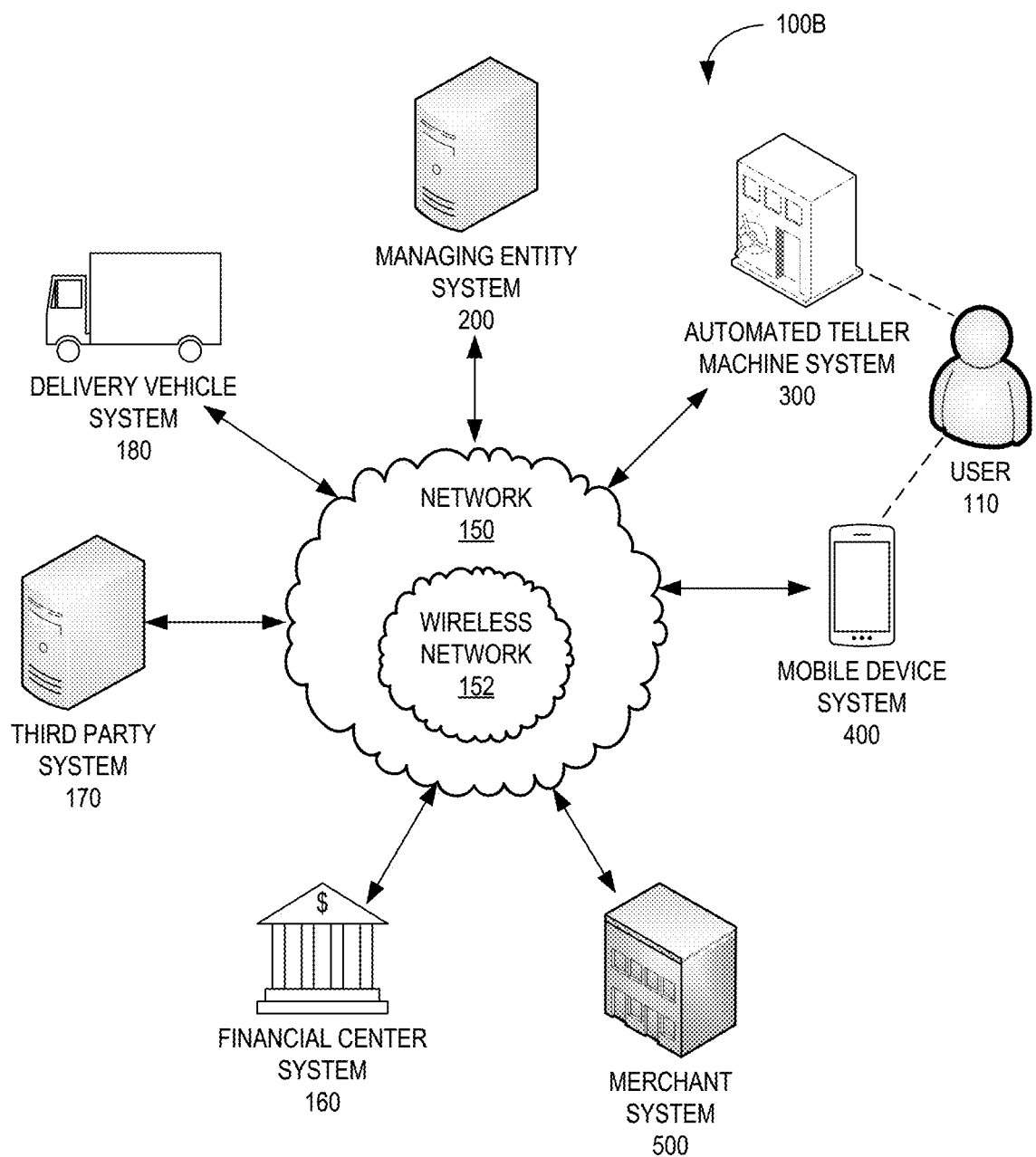
Figure 2:
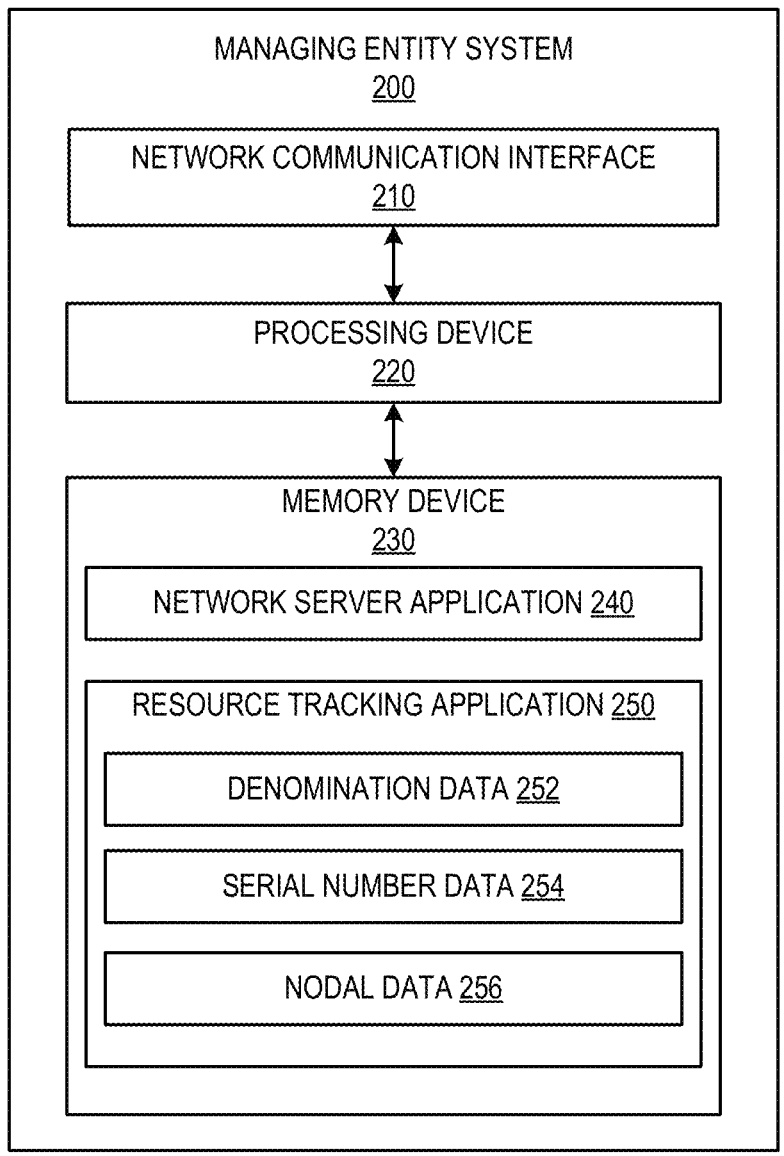
Figure 3:
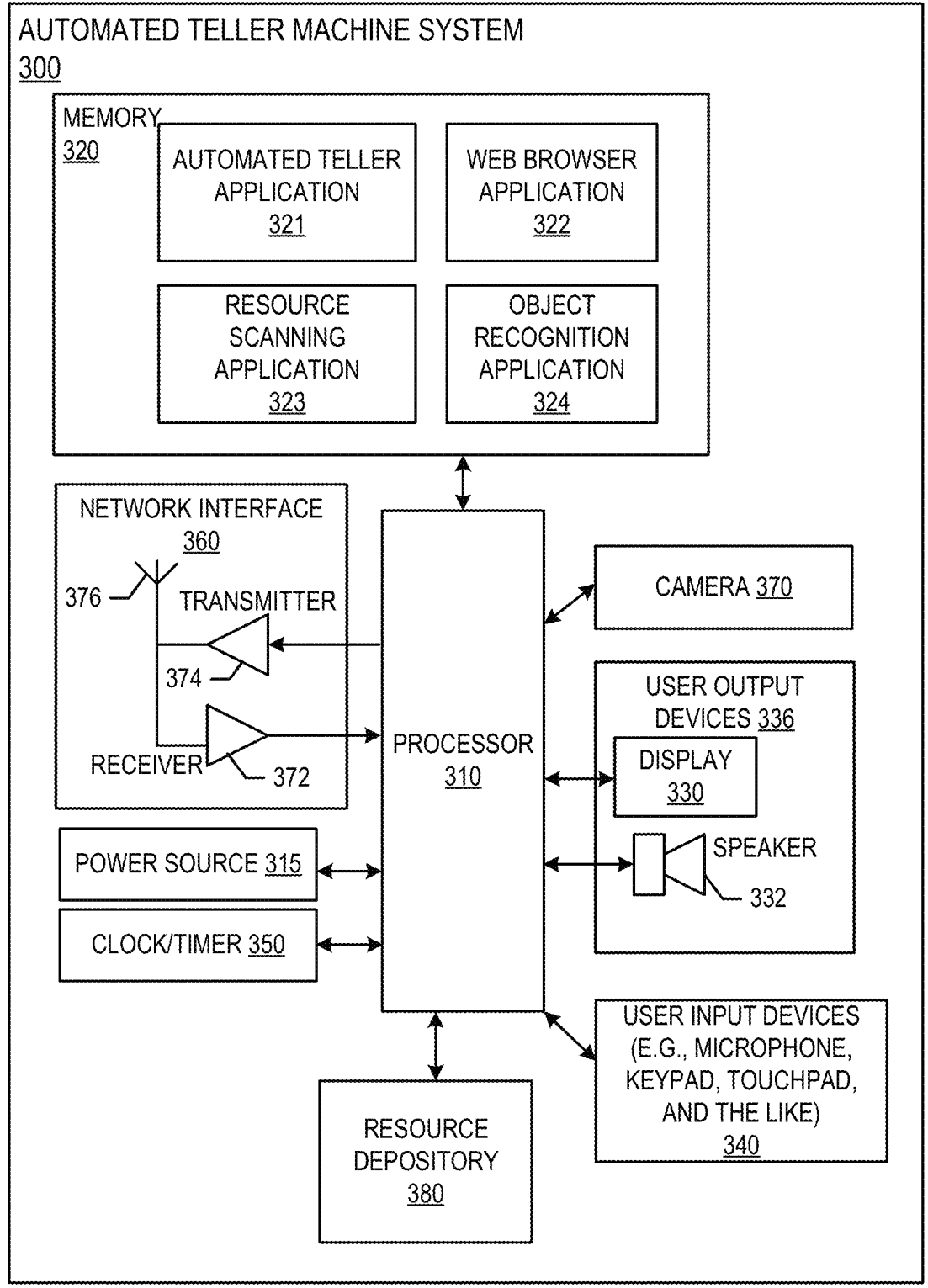
Figure 4:
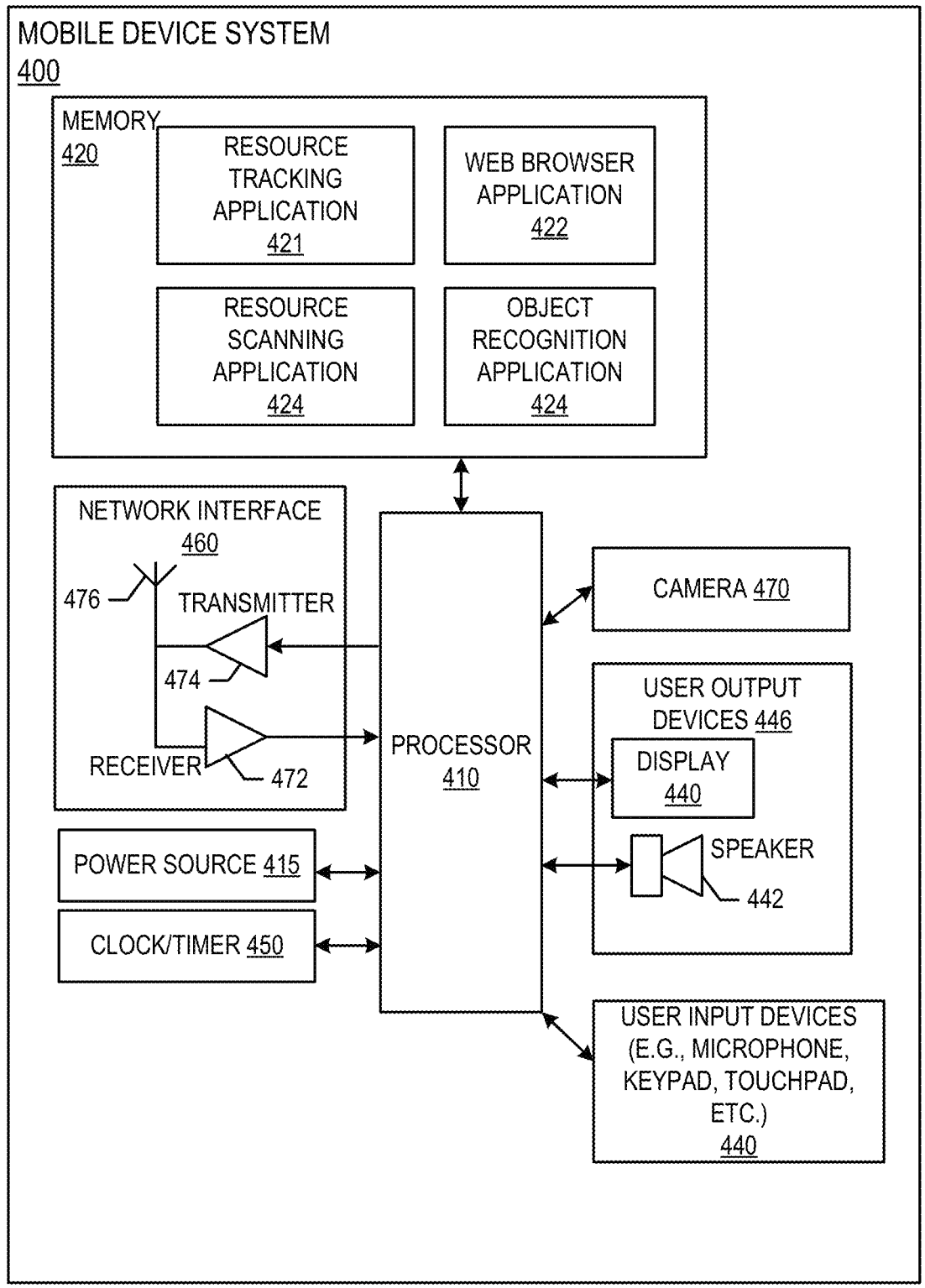
Figure 5:
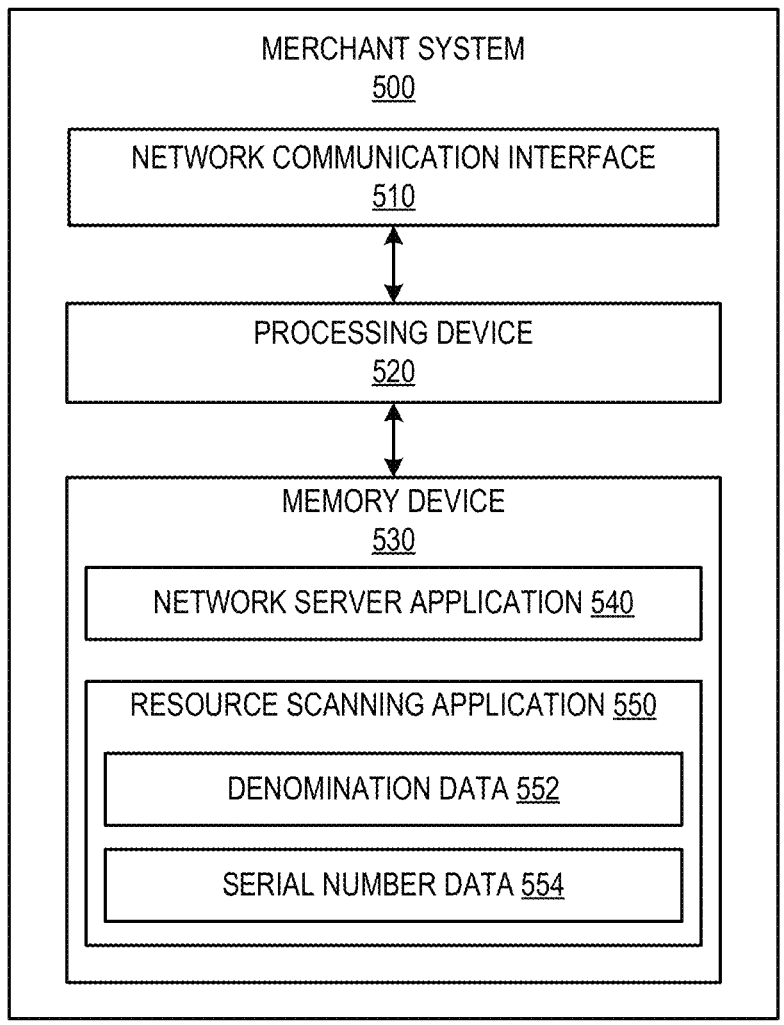
Figure 6:
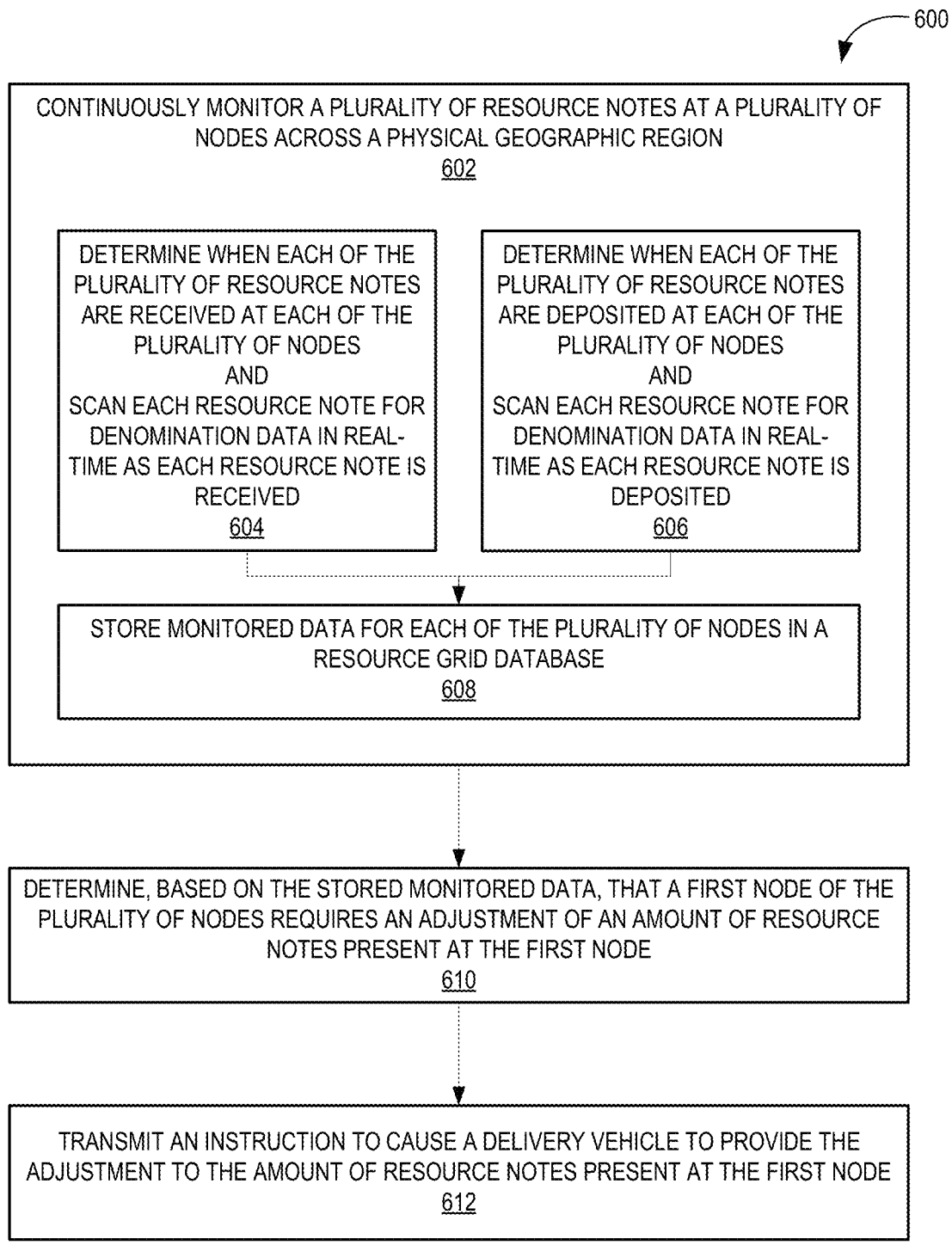

Having thus described embodiments of the invention in general terms, reference will now be made the accompanying drawings, wherein:

FIG. 1A provides a block diagram illustrating a nodal network for tracking resources within the network, in accordance with an embodiment of the invention;

FIG. 1B provides a block diagram illustrating a system environment for tracking resources within a network, in accordance with an embodiment of the invention;

FIG. 2 provides a block diagram illustrating the managing entity system of FIG. 1B, in accordance with an embodiment of the invention;

FIG. 3 provides a block diagram illustrating the automated teller machine system of FIG. 1B, in accordance with an embodiment of the invention;

FIG. 4 provides a block diagram illustrating the mobile device system of FIG. 1B, in accordance with an embodiment of the invention;

FIG. 5 provides a block diagram illustrating the merchant system 500 of FIG. 1B, in accordance with an embodiment of the invention; and FIG. 6 provides a flowchart illustrating a process for providing on-demand resource delivery to resource dispensers, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, the term "managing entity" may refer to an entity, company, organization, or any other group or collection of entities that manages, monitors, owns, or otherwise controls one or more aspects of a resource grid network for identifying, storing, and tracking resources. In some embodiments, the managing entity is a financial institution with financial customers that are associated with or at least interact with one or more nodes within the resource grid network.

As used herein, the terms "resource," "tangible resource," "cash," "bill," "note," "bank note," "money," and "currency," may be interchangeable and may at least generally reference individual bank notes, coins, and/or other currency that may be traceable. As such, it should be known that embodiments that reference only "bank notes" may additionally or alternatively contemplate the inclusion of coins, checks, important documents (e.g., checks, contracts, and the like), and the like, or any combination thereof.

As used herein, the term "node" refers to a physical electronic device that is in network communication with one or more other nodes and/or a managing system (e.g., via a managing entity server), such that information may be generated, transmitted, received, encrypted, and the like, between the nodes and/or the managing entity system via network communication channels.

Generally, the systems, methods, and computer program products described herein provide techniques, computer networks, and monitoring systems for managing and/or operating a nodal grid network in which resources (e.g., bank notes or cash) are received, dispensed, and transferred throughout the nodal grid network. The nodal network may comprise automated teller machines (ATMs), merchant stores, delivery vehicles (e.g., delivery trucks, armored vans, smart cars, cargo planes, and the like), processing centers, financial institution branches, and the like. The system scans resource notes for denomination data (and, in some cases, unique identifier or serial number data) as the resource notes are received and/or dispensed at each of the nodes. The scanned resource notes and the denomination data (and the unique identifiers) allow the system to track quantities of resource notes at each node, total values of the resource notes at each node, quantities of each denomination of the resource nodes at each node, and the like. This information about the resource notes and the nodes at which the resource notes are processed can be recorded and stored in real-time, such that the system can make real-time decisions regarding how to address any issues with the health of each node (e.g., a node needs an adjustment of the quantity of resource notes currently stored at its location. Historical nodal data can be analyzed to identify trends that, when extrapolated, provide insight into an expected health of a node at some future point (or points) in time.

FIG. 1A provides a block diagram illustrating a network 100A for a resource network grid, in accordance with embodiments of the invention. As illustrated in FIG. 1A, the network 100A includes a managing entity system 200 and multiple nodes (Node 1, Node 2, Node 3, Node 4, through Node "N"). While five nodes are shown in FIG. 1A, it should be known that any number of nodes may be present. This may be represented by "Node N" in FIG. 1, illustrating that there may be a total of "N" nodes in the system environment.

Nodes 1 through Node "N" may be configured to communicate with each other and/or a managing entity system 200 over a network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In one embodiment, the network 150 includes a wireless network (e.g., a wireless telephone network).

As shown in FIG. 1A, the nodes in the network 100A may comprise or otherwise be in communication with one or more node datastores (e.g., Datastore 1, Datastore 2, Datastore 3, Datastore 4, through Datastore "N"). While FIG. 1 illustrates one datastore for each node, it should be known that each node may be associated with one or more datastores, and a single datastore may be associated with more than one node. For example, the managing entity system 200 may comprise a master datastore, such that information from each node may be transmitted to the managing entity system 200 and stored in the master datastore within the managing entity system. In such embodiments, nodal information may not be stored in datastores associated with each node. In some embodiments, nodal information for one node may be stored in multiple datastores within the system, thereby backing up the nodal information on separate datastores for security and validation purposes.

As described above, a node generally refers to a physical electronic device that is in network communication with one or more other nodes and/or a managing system. Examples of the electronic device comprising the node includes, but is not limited to, automated teller machines (ATMs), financial center systems (e.g., ATMs, point of sale (POS) devices, scanning devices, electronic safety deposit devices, cash vaults, other resource inventory locations, and the like), merchant systems (e.g., cash registers, vending machines, self-checkout devices, POS devices, electronic safes, scanning devices, and the like), delivery vehicle systems (e.g., mobile resource monitoring devices, and the like), mobile devices (e.g., mobile smart phones, mobile scanning devices, and the like). Of course, any other device or system can be considered a node, as long as it is configured to acquire, store, and/or transmit information to the managing entity system 200 and/or other nodes within the network 100A.

Additionally or alternatively, a node may refer to a physical location (e.g., a geographic location, a geographic region, a store or other building location, a non-electronic location like a safe, and the like). In such embodiments, one or more datastores may be associated with the physical locations, such that at least a portion of each datastore comprises information that is associated with contents of the physical location. For example, a datastore associated with a mobile scanning device used by a delivery vehicle driver may be associated with contents of an associated delivery vehicle, such that the datastore comprises information (e.g., real-time information and/or historical information) about contents of the delivery vehicle.

In some embodiments, the nodes (or electronic devices associated with the nodes), may be configured to track movement of resources (e.g., cash, bank notes, valuable items, and the like) throughout the network 100A. In some such embodiments, the nodes are configured to track individual bills, bank notes, and the like, across the network 100A to determine quantities and values of cash at each node at one or more points in time. By tracking the quantities and values of cash at each node in the network 100A over time (e.g., continuously in real-time, in near real-time, or periodically), a system can identify trends of the movement of cash throughout the network 100A.

Therefore, in some embodiments, individual cash bills (e.g., bank notes) are analyzed (e.g., as they are received, while they are stored, and/or as they are being dispensed or are otherwise leaving) at a node of the network 100A. For example, a bank note deposited at a node comprising a financial center may be scanned by a scanner of the financial center to ascertain identifiable information of the bank note.

The term identifiable information, as used herein, shall refer to any information that may be ascertained from a bank note to identify one or more of the following features: a bank note denomination, a coin denomination, a serial number, a date of printing or manufacture, a location of printing or manufacture, a weight, a metallic content, an ink type, a paper type, a security measure (e.g., a reflective characteristic, a watermark, and the like), a marking (e.g., an intentional marking or a general wear and tear marking), physical characteristics of the bank note, or any other information that identifies the bank note in some way and/or provides information about the authenticity of the bank note.

Any type of scanner may be used at a node, including scanners designed specifically to measure or otherwise ascertain one or more piece of identifiable information. For example, a scanner may be an optical camera, an infrared camera, a barcode scanner, a quick response (QR) code scanner, a radio frequency identification (RFID) tag scanner, a scale, an optical character recognition (OCR) device, a smartphone (or a component of a smartphone), and the like. Additionally or alternatively, identifiable information of one or more bank notes may be manually input into a node database by a user, merchant, employee of a financial institution, employee of a managing entity, and the like. For example, a user may manually input a denomination and serial number of a bank note before storing the bank note in an electronic safe.

The datastores (e.g., Datastore 1, Datastore 2, Datastore 3, Datastore 4, through Datastore "N"), may record the identifiable information for one or more bank notes associated with their respective nodes (Node 1, Node 2, Node 3, Node 4, through Node "N", respectively). In this way, the network 100A can maintain a real-time, near real-time, and/or periodic point-in-time picture of the contents of each individual node in the network 100A and the contents of the network 100A as a whole. To accomplish the task of maintaining a survey of the node contents (and the network 100A as a whole), each datastore within the network 100A may record information that will enable the managing entity system 200 to monitor the node contents. Therefore, each datastore in the network 100A may store information associated with the denominations of bank notes located at its respective node, serial numbers (or other unique identifiers) of bank notes at its respective node, validity information (e.g., information associated with the confidence that the received or stored bank note is an authentic bank note), quality information (e.g., information associated with the structure, visibility, a period of time in existence, and the like of received or stored bank notes), and the like. In some embodiments, one or more datastores may provide a breakdown of bank notes that are associated with one or more nodes, one or more customers, and the like. For example, a node comprising a financial center system may associate each received bank note with one or more checking accounts, savings accounts, investing accounts, and the like for one or more customers of financial center system. In this way, the datastore of the financial center system node can store information about the total cash situation for the financial center system as well as information about sub-categories (e.g., users, accounts, and the like) within the financial center system. Furthermore, datastores associated with each node may store timing information about each received or scanned bank note to identify.

In this way, the managing entity system 200 of the network 100A may be configured to monitor the identifiable information stored at each node to determine characteristics of the network 100A. For example, the managing entity system 200 can determine a total value of the bank notes accounted for in the network (e.g., located at each node, in transit between nodes, a cumulative total value for all nodes, and the like). The managing system 200 can also track one or more single bank notes (e.g., by tracking a serial number or other unique identifier of the single bank note) over time as the one or more bank notes progress through the network 100A.

By tracking individual bank notes through multiple nodes of the network 100A, the managing entity system 200 may be able to identify trends of the network as a whole as well as trends of each individual node. For example, the managing entity system 200 may be able to make determinations about when a node is likely to run low on cash. To illustrate this example, we can assume Node 1 is an ATM that is configured to accept deposits of cash and to dispense cash as customers of the managing entity desire. The managing entity system 200 may track a quantity of each denomination of bank note stored within a cash receptacle of Node 1, and/or a total value of the bank notes stored at the ATM of Node 1 over a period of time. Once the tracking of the quantity of each denomination of bank notes and/or the total value of bank notes stored at Node 1 dips below one or more predetermined threshold values, the managing entity system 200 may automatically transmit an alert or instructions to a delivery vehicle system or other system of the managing entity system 200 to provide additional bank notes (and, in some embodiments, a specific quantity of one or more bank notes and/or a specific total value of bank notes) to the ATM of Node 1 within a defined period of time to prevent the ATM from running out of available funds for withdrawal.

In some such embodiments, the managing entity system 200 may determine, based on tracking the identifiable information of bank notes stored at Node 1, a trend in the quantity of one or more denominations of bank notes and/or a total value of the bank notes stored at Node 1. In this way, the managing entity system 200 may extrapolate the trend to identify a point in time that the ATM of Node 1 should be refilled with new bank notes, as described above. By determining a trend of the bank note denomination quantity (or quantities) and/or the total value of Node 1, the managing entity system 200 can transmit instructions for refilling the ATM of Node 1 at a later point in time, to provide more time for a refilling system (e.g., a delivery driver and a delivery vehicle) to prepare for refilling, and to travel to the physical location of the ATM of Node 1. In this way, the managing entity system 200 can organize or adjust a delivery system schedule ahead of time, before a node runs low on available funds for dispensing.

The identifiable information of contents at a node can be tracked and/or associated with time of day, time of month, day of the week, holiday, and other calendar-based scenarios to predict how the amount of cash located at each node (as well as how much cash is transported between two or more nodes) can be expected to change at any given time. For example, the managing entity system 200 determine, based on historical data for each node, that financial center nodes of the network 100A tend to incur a significant decrease in the total amount of cash available near the end of each work week. As such, the managing entity system 200 can use the historical data of each financial center node to predict how much cash is expected to be dispensed at each respective node and thereby can plan to provide at least the respective predicted amount of cash for each node ahead of time.

The managing entity system 200 can also monitor the network 100A to identify inconsistencies, duplicate items, and other potential issues with one or more nodes in the network 100A. For example, the managing entity system 200 may determine that multiple nodes have identified a duplicate serial number for a bank note (i.e., a first node reports that a bank note with a specific serial number is securely stored in the physical location of the first node and a second node reports that a bank note with the same specific serial number is stored in the physical location of that second node.) This determination of multiple bank notes comprising the same serial number (or other unique identifying information) may inform the managing entity system 200 of a potential error, a potential malfeasance, or some other issue that should be addressed. In some embodiments, the managing entity system 200 may be configured to transmit one or more instructions (e.g., a command signal or other electronic signal) to an electronic device associated with one or more of the affected nodes in the network 100A, where the instructions are configured to cause the electronic device to shut down, change security protocols (e.g., require an additional level of authorization before withdrawal of cash, and the like), physically separate bank notes with duplicate serial numbers (e.g., place bank notes with a duplicate serial number somewhere in the network 100A in a separate compartment that is not part of dispensing activities of the node), and the like.

In some embodiments, the managing entity system 200 may track individual bank notes and is thereby able to identify potential cash purchases and other spending made by customers at a merchant node within the network 100A. For example, a managing entity system 200 may track a bank note at an ATM node by scanning the bank note for a serial number, determine that this specific bank note is withdrawn from the ATM node by a known customer, and at a later point in time identify the same bank note (i.e., by scanning the bank note to identify the same serial number) at a self-checkout device of a merchant node within the network 100A. The implication here is that the same user has conducted the cash transaction at a merchant store associated with the merchant node. Therefore, the managing entity system 200 may transmit an alert to the known customer (e.g., via a mobile device known to be associated with the known merchant, or the like), where the alert requests confirmation of the customer's purchase at the merchant node.

By tracking the cash flow from an ATM node to a merchant node within the network 100A, the managing entity can update information associated with the known customer's online banking data to include information associated with information received from the merchant node. For example, the merchant node may transmit product information, price information, merchant type information, time of transaction information, and the like to the managing entity system 200, and the managing entity system 200 may update historical transactional information of the known customer. This technique of tracking cash purchases enables a financial institution to provide a more robust account of the known customer's transactions over time than by using credit, debit, and online transactional information alone.

Furthermore, the techniques for tracking cash flow through the network (and particularly as associated with a known customer), allow a managing entity system 200 to provide programs to the known customer based on the cash transactions of the known customer.

Turning now to FIG. 1B, a block diagram is provided, illustrating a system environment 100B, in accordance with one or more embodiments of the invention. As illustrated in FIG. 1B, the system environment 100 includes a managing entity system 200, an automated teller machine (ATM) system 300, a mobile device system 400, a merchant system 500, a financial center system 160, a third party system 170, and a delivery vehicle system 180. Additionally, the system environment 100 may comprise a user 110 that is interacting with the ATM system 300 and/or the mobile device system 400. The user 110 may represent a customer of the managing entity, a customer of a financial entity, and the like. While FIG. 1B illustrates a single user 110, it should be known that multiple users may be associated with the system environment 100B and/or the managing entity system 200. Furthermore, while the user 110 in FIG. 1B is associated with the ATM system 300 and the mobile device system 400, it should be known that the user 110 may additionally or alternatively be associated with the merchant system 500 (e.g., the user 110 may conduct one or more transactions with the merchant system 500), the financial center system 160 (e.g., the user 110 may conduct one or more deposits or transactions with the financial center system 160), the third party system 170, and/or the delivery vehicle system 180.

Additionally, while a single ATM system 300, mobile device system 400, merchant system 500, financial center system 160, third party system 170, and delivery vehicle system 180 are illustrated in FIG. 1B, it should be known that any number of each of these systems may be present in the system environment 100B.

In some embodiments, the nodes (i.e., Node 1 through Node "N") of FIG. 1A include or are otherwise comprised of one or more of the systems illustrated in FIG. 1B (i.e., the ATM system 300, the mobile device system 400, the merchant system 500, the financial center system 160, the third party system 170, and/or the delivery vehicle system 180). In such embodiments, the managing entity system 200 may manage, control, monitor, or otherwise oversee the illustrated systems of FIG. 1B in the same manner as the managing entity system 200 engages with the nodes comprising the network 100A in FIG. 1A.

For example, in some embodiments, the managing entity system 200 is controlled by a managing entity with a presence across a geographical area. Within that geographical area, the managing entity may manage or otherwise exert some control over a plurality of ATM systems (e.g., ATM system 300) and financial center systems (e.g., financial center locations like the financial center system 160).

Additionally, the managing entity with control over the managing entity system 200 may have some relationship with multiple merchants systems 500 in the geographical region (e.g., the managing entity may have some agreement in place to receive transactional information from POS devices, self-checkout devices, and the like, at one or more merchant locations).

Furthermore, the financial entity may have a plurality of customers (e.g., the user 110 and other users within the system environment 100B) located within the geographical area. These customers may have accounts (e.g., financial accounts) with the financial entity, such that the financial entity can receive and record transactional information of each customer over time. These customers may also be associated with one or more mobile devices (e.g., the mobile device system 400) that may represent or otherwise be associated with a node in the system environment 100B. As such, the managing entity may provide one or more mobile device applications to a mobile device system 400 of each customer (e.g., the user 110), whereby the provided mobile device applications provide the mobile device system 400 and/or the customer with functionality to act as or supplement one or more nodes within the system environment 100B.

The managing entity system 200, the ATM system 300, the mobile device system 400, the merchant system 500, the financial center system 160, the third party system 170, and the delivery vehicle system 180 may be configured to communicate over a network 150. As described above, the network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In one embodiment, the network 150 includes a wireless telephone network 152.

In general, the managing entity system 200 is in network communication with other devices, such as the ATM system 300, the mobile device system 400, the merchant system 500, the financial center system 160, the third party system 170, and/or the delivery vehicle system 180 via the network 150 to monitor traceable resources (e.g., cash, bank notes, and the like) across a network of nodes. The managing entity system 200 may be owned by, or otherwise controlled by a managing entity. This managing entity may be a financial entity, a security services entity, a government agency, or any other entity that can monitor individual bank notes across one or more nodes of a nodal network. The managing entity system 200 is described in more detail with respect to FIG. 2, below.

The ATM system 300 may comprise any computing device that is configured to receive cash deposits, store individual bank notes, scan individual bank notes, dispense one or more individual bank notes, interface with one or more customers, and communicate with one or more other systems via the network 150. While the ATM system 300 in FIG. 1B references an ATM, it should be known that the ATM system 300 may encompass multiple ATMS, one or more point of sale devices, a financial safe device, a cash vault, or any other computing device configured to perform functions of receiving cash, scanning cash, storing cash, and/or communicating with other systems via the network 150.

In some embodiments of the inventions, the ATM system 300 is simply configured to carry out the operations of the processes described herein, as instructed by the managing entity system 200 and/or a third party system 170. In other embodiments, the ATM system 300 is configured to provide the appropriate instructions as well as to carry out at least some of the operations necessary for the processes described herein. In some embodiments of the invention, at least a portion of the ATM system 300 is a component of the managing entity system 200. The ATM system 300 is described in greater detail with respect to FIG. 3, below.

The mobile device system 400 of FIG. 1B may be configured to connect with the network 150 to interface the user 110 or a different person with an application of the managing entity system 200, the ATM system 300, the merchant system 500, the financial center system 160, the third party system 170, and/or the delivery vehicle system 180. A user 110, in order to access the user's account(s), online banking application and/or mobile banking application on the managing entity system 300 may be required to provide authentication credentials to the managing entity system 200 and/or another system before the mobile device system 400 will complete one or more of the functions described herein. This authentication step will help the managing entity system 200 increase a confidence that the mobile device system 400 is acting at the request of the specific user 110 that the user 110 purports to be or represent. For example, logging into the managing entity system 200 generally requires that the user 110 authenticate his/her identity using a user name, a passcode, a cookie, a biometric identifier, a private key, a token, and/or another authentication mechanism that is provided by the user 110 to the managing entity system 200 via the mobile device system 400.

The mobile device system 400 of FIG. 1B may be configured to carry out one or more of the nodal functions described with respect to the nodes of FIG. 1A. As such, the mobile device system 400 may be configured to scan bank notes, transmit identifiable information of the bank notes to the managing entity system 200 (or one or more other systems within the system environment 100B). In some embodiments, the mobile device system 400 can provide information that is to be related to a specific node. For example, the user 110 may scan in a serial number for a specific bank note using a camera of the mobile device system 400, and provide an input that the specific bank note should be associated with a node related to a merchant system 500.

In other embodiments, the mobile device system 400 may represent a node closely related to a user 110. For example, a user 110 can be considered to have a cash that vary as the user 110 receives and spends cash. As such, the mobile device system 400 may be utilized by the user 110 to scan individual bank notes as they are received and/or transmitted (e.g., as part of a cash transaction). In this way, the mobile device system 400 may store information associated with at least some of the individual bank notes that likely are in the possession of the user 110 at any given point in time. By tracking user 110 nodes within the system environment 100B network, a managing entity can better track individual bank notes over time and better understand how the individual bank notes are used, processed, and transferred throughout the system environment 100B. The mobile device system 400 is described in more detail with respect to FIG. 4, below.

The merchant system 500 of FIG. 1B may be any system owned or otherwise controlled by a merchant entity and may include one or more devices associated with processing cash transactions, deposits, and the like. For example, a merchant system 500 may comprise one or more point of sale devices that are configured to scan individual bank notes as they are received. Additionally or alternatively, a merchant system 500 may comprise one or more self-checkout devices that are configured to receive cash payments from customers of the merchant, where the self-checkout devices are further configured to scan individual bank notes as they are received at the device. In some embodiments, the merchant system 500 may comprise a cash counting device that is configured to scan one or more individual bank notes (e.g., a merchant may process cash payments at least periodically through a cash counting device), such that information about the individual bank notes associated with the merchant system 500 may be identified, recorded, or otherwise monitored by the managing entity system 200. The merchant system 500 is described in more detail with respect to FIG. 5, below.

The financial center system 160 may comprise one or more cash processing centers or systems, one or more physical locations of a financial institution (e.g., a banking center), one or more centers or systems for validating the authenticity of bank notes, and/or the like. In some embodiments, the financial center system 160 may be a component of the managing entity system 200. For example, the managing entity may comprise a financial entity that owns or otherwise controls the financial center system 160.

Furthermore, the financial center system 160 may comprise one or more devices configured to scan, record, or otherwise acquire and store information associated with one or more individual bank notes, as the bank notes are received, processed, and/or dispensed.

The third party system 170 may be associated with one or more third party entities (e.g., a government agency, a regulatory agency, a financial institution, and the like). The third party system 170 may own or otherwise control one or more aspects of the system environment 100 (e.g., the ATM system 300, the financial center system 160, or the delivery vehicle system 180). Furthermore, in some embodiments, the third party system 170 may comprise one or more devices configured to scan, record, or otherwise acquire and store information associated with one or more individual bank notes, as the bank notes are received, processed and/or dispensed.

The delivery vehicle system 180 may be associated with one or more delivery vehicles (e.g., delivery trucks, armored vans, cargo planes, delivery drones, cargo ships, and the like) that pick up, deliver, and otherwise transfer resource notes between two or more nodes within the resource grid system environment 100B. In some embodiments, these delivery vehicles are considered nodes themselves (e.g., they are associated with a resource note scanning device, and the like). Furthermore, the delivery vehicles may comprise or be associated with global positioning system (GPS) devices, such that the managing entity system 200 can track the actual location of the delivery vehicles in real-time (or review historical location data of the delivery vehicles).

In some embodiments, the delivery vehicles of the delivery vehicle system 180 are configured to receive instructions or orders from the managing entity system 200, a third party system 170, and/or the merchant system 500 to pick up, deliver, or otherwise transfer sets of resource notes from one node of the resource grid network to another node (e.g., from one ATM to another ATM, from one merchant system to a financial center, and the like).

FIG. 2 provides a block diagram illustrating the managing entity system 200 of FIG. 1B in greater detail, in accordance with embodiments of the invention. As illustrated in FIG. 2, and in one embodiment of the invention, the managing entity system 200 includes one or more processing devices 220 operatively coupled to a network communication interface 210 and a memory device 230. In certain embodiments, the managing entity system 200 is operated by a managing entity, such as a financial institution, while in other embodiments, the managing entity system 200 is operated by an entity other than a financial institution.

It should be understood that the memory device 230 may include one or more databases, datastores, or other data structures/repositories. The memory device 230 also includes computer-executable program code that instructs the processing device 220 to operate the network communication interface 210 to perform certain communication functions of the managing entity system 200 described herein. For example, in one embodiment of the managing entity system 200, the memory device 230 includes, but is not limited to, a network server application 240, resource tracking application 250 that includes denomination data 252, serial number data 254, and nodal data 256.

The computer-executable program code of the network server application 240 or the resource tracking application 250 may instruct the processing device 220 to perform certain logic, data-processing, and data-storing functions of the managing entity system 200 described herein, as well as communication functions of the managing entity system 200. For example, the managing entity system 200 may be configured to cause the network communication interface 210 to instruct (and/or receive feedback from) the ATM system 300, the mobile device system 400, the merchant system 500, the financial center system 160, and/or the third party system 170 to perform certain functions. In this way, the managing entity system 200 may be configured to cause the components of the system environment 100 to perform certain tasks such scanning received or stored individual bank notes, recording identifiable information for each individual bank note, and storing time-based data for bank notes received, stored, and/or transmitted by each system.

In one embodiment, the resource tracking application 250 includes denomination data 252, serial number data 254, and other nodal data 256. The denomination data 252 may comprise any information associated with techniques for identifying a denomination of a currency. For example, the denomination data 252 may comprise information about sizes, weights, coloring, physical features, artistic features, numerical features, and the like for each denomination of any number of currencies (including foreign currencies). In this way, the managing entity system 200 may be able to compare an input of received currency characteristics with the denomination data 252 to determine a denomination of the currency.

Similarly, the serial number data 254 may comprise a datastore of one or more known serial numbers of acquired currency, or currency once acquired. For example, the managing entity system 200 may store any identified serial number data 254 within the resource tracking application 250.

The denomination data 252 and/or the serial number data 254 may additionally be related to nodal data 256, or data associated with individual nodes of a nodal network. For example, the nodal data 256 may comprise information about a nodal system (e.g., an ATM system 300, a mobile device system 400, a merchant system 500, a financial center system 160, and/or a third party system 170). This information about a nodal system may comprise location information for one or more nodes, total value of bank notes or other cash stored at one or more nodes, quantities of one or more denominations of bank notes for one or more nodes, historical data for one or more nodes, trend information for one or more nodes, and the like. In this way, the managing entity system 200 may be able to identify a serial number for each item of currency (i.e., each bank note) that it has in possession at each node in a nodal network.

As used herein, a "communication interface" generally includes a modem, server, transceiver, and/or other device for communicating with other devices on a network, and/or a user interface for communicating with one or more customers. The network communication interface 210 is a communication interface having one or more communication devices configured to communicate with one or more other devices on the network 150, such as the ATM system 300, the mobile device system 400, the merchant system 500, the financial center system 160, and/or the third party system 170. The processing device 220 is configured to use the network communication interface 210 to transmit and/or receive data and/or commands to and/or from the other devices connected to the network 150.

FIG. 3 provides a block diagram illustrating at least a portion of the automated teller machine (ATM) system 300 of FIG. 1B in more detail, in accordance with embodiments of the invention. The ATM system 300 may comprise multiple ATMs, point of sale transaction devices, self-checkout devices, financial safe devices, or any other computing devices configured to scan, record, store, and/or dispense bank notes, other currency, or other important items. However, for the sake of simplicity, the ATM system 300 will be described with respect to FIG. 3 as a single ATM.

Some embodiments of the automated teller machine system 300 include a processor 310 communicably coupled to such devices as a memory 320, user output devices 336, user input devices 340, a network interface 360, a power source 315, a clock or other timer 350, a camera 370, and/or a resource depository 380. The processor 310, and other processors described herein, generally include circuitry for implementing communication and/or logic functions of the automated teller machine system 300. For example, the processor 310 may include a digital signal processor device, a microprocessor device, and various analog to digital converters, digital to analog converters, and/or other support circuits. Control and signal processing functions of the automated teller machine system 300 are allocated between these devices according to their respective capabilities. The processor 310 thus may also include the functionality to encode and interleave messages and data prior to modulation and transmission. The processor 310 can additionally include an internal data modem. Further, the processor 310 may include functionality to operate one or more software programs, which may be stored in the memory 320. For example, the processor 310 may be capable of operating a connectivity program, such as a web browser application 322. The web browser application 322 may then allow the automated teller machine system 300 to transmit and receive web content, such as, for example web page content, according to a Wireless Application Protocol (WAP), Hypertext Transfer Protocol (HTTP), and/or the like.

The processor 310 is configured to use the network interface 360 to communicate with one or more other devices on the network 150. In this regard, the network interface 360 includes an antenna 376 operatively coupled to a transmitter 374 and a receiver 372 (together a "transceiver"). The processor 310 is configured to provide signals to and receive signals from the transmitter 374 and receiver 372, respectively. The signals may include signaling information in accordance with the air interface standard of the applicable cellular system of the wireless telephone network 152. In this regard, the automated teller machine system 300 may be configured to operate with one or more air interface standards, communication protocols, modulation types, and access types. By way of illustration, the automated teller machine system 300 may be configured to operate in accordance with any of a number of first, second, third, and/or fourth-generation communication protocols and/or the like. For example, the automated teller machine system 300 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 3GPP protocols and/or the like. The automated teller machine system 300 may also be configured to operate in accordance with non-cellular communication mechanisms, such as via a wireless local area network (WLAN) or other communication/data networks. Of course, the network interface 360 may also comprise a wireline connection to at least a portion of the network 150.

As described above, the automated teller machine system 300 has a user interface that is, like other user interfaces described herein, made up of user output devices 336 and/or user input devices 340. The user output devices 336 include a display 330 (e.g., a liquid crystal display or the like) and a speaker 332 or other audio device, which are operatively coupled to the processor 310. The user input devices 340, which allow the automated teller machine system 300 to receive data from a user such as the user 110, may include any of a number of devices allowing the automated teller machine system 300 to receive data from the user 110, such as a keypad, keyboard, touch-screen, touchpad, microphone, mouse, joystick, other pointer device, button, soft key, and/or other input device(s). The user interface may also include a camera 370, such as a digital camera.

The automated teller machine system 300 further includes a power source 315, such as a battery or power line, for powering various circuits and other devices that are used to operate the automated teller machine system 300. Embodiments of the automated teller machine system 300 may also include a clock or other timer 350 configured to determine and, in some cases, communicate actual or relative time to the processor 310 or one or more other devices.

The automated teller machine system 300 also includes a memory 320 operatively coupled to the processor 310. As used herein, memory includes any computer readable medium (as defined herein below) configured to store data, code, or other information. The memory 320 may include volatile memory, such as volatile Random Access Memory (RAM) including a cache area for the temporary storage of data. The memory 320 may also include non-volatile memory, which can be embedded and/or may be removable. The non-volatile memory can additionally or alternatively include an electrically erasable programmable read-only memory (EEPROM), flash memory or the like.

The memory 320 can store any of a number of applications which comprise computer-executable instructions/code executed by the processor 310 to implement the functions of the automated teller machine system 300 and/or one or more of the process/method steps described herein. For example, the memory 320 may include such applications as an automated teller application 321, a conventional web browser application 322, a resource scanning application 323, and/or an object recognition application 324. These applications also typically provide a graphical user interface (GUI) on the display 330 that allows the first user 110 to communicate with the automated teller machine system 300, the financial institution system 300, and/or other devices or systems.

The memory 320 can also store any of a number of pieces of information, and data, used by the automated teller machine system 300 and the applications and devices that make up the automated teller machine system 300 or are in communication with the automated teller machine system 300 to implement the functions of the automated teller machine system 300 and/or the other systems described herein. For example, the memory 320 may include such data as user authentication information, and the like.

The automated teller application 321 of the memory 320 may comprise instructions for causing components of the ATM system 300 to perform certain functions that relate to transactions, deposits, withdrawals, and other financial actions. For example, the automated teller application 321 may cause the user output devices 336 to output certain information to a user (e.g., the user 110) and/or allow a user to input information regarding a financial transaction by using the user input devices 340. A user may be able to deposit an amount of cash into the automated teller system by inserting bank notes and/or coins into the resource depository 380 of the ATM system 300. The automated teller application 321 may cause one or more components of the ATM system 300 to measure, track, and/or store the deposited bank notes and/or coins, and store this information in the memory 320 for later use.

The object recognition application 324 may instruct one or more components of the ATM system 300 to detect, measure, analyze, or otherwise identify information found on (or associated with) the deposited bank notes and/or coins. For example, the object recognition application 324 may cause the camera 370 to acquire an image of a received bank note, where the image can then be analyzed by the object recognition application 324 to identify one or more useful features of the received bank note. In some embodiments, the object recognition application 324 and/or the automated teller application 321 may be configured to identify denominations of received currency, serial numbers of received currency, and/or make determinations on the validity of received currency.

The resource scanning application 323 of the memory 320 may be configured to provide instructions to components of the ATM system 300 for collecting, scanning, and/or tracking one or more bank notes, coins, other currency, or other important documents. For example, the resource scanning application 323 may cause the camera 370 to scan one or more bank notes (e.g., as they are received, while they are stored in the resource depository 380, and/or as bank notes are dispensed), to store information from the scan within the memory 320, and/or transmit the scan to the managing entity system 200 so the managing entity system 200 can monitor the ATM system 300 as a node in a resource network.

FIG. 4 provides a block diagram illustrating at least a portion of the mobile device system 400 of FIG. 1B in more detail, in accordance with embodiments of the invention. In one embodiment of the invention, the mobile device system 400 comprises a mobile telephone. However, it should be understood that a mobile telephone is merely illustrative of one type of mobile device that may benefit from, employ, or otherwise be involved with embodiments of the present invention and, therefore, should not be taken to limit the scope of embodiments of the present invention. Other types of mobile devices may include portable digital assistants (PDAs), pagers, mobile televisions, gaming devices, laptop computers, video recorders, audio/video players, radios, global positioning system (GPS) devices, mobile tablet computers, wearable devices, smartwatches, or any combination of the aforementioned.

The mobile device system 400 may comprise multiple mobile devices and/or multiple types of mobile devices. However, for the sake of simplicity, the mobile device system 400 will be described with respect to FIG. 4 as a single mobile device.

Some embodiments of the mobile device system 400 include a processor 410 communicably coupled to such devices as a memory 420, user output devices 436, user input devices 440, a network interface 460, a power source 415, a clock or other timer 450, and/or a camera 470. The processor 410, and other processors described herein, generally include circuitry for implementing communication and/or logic functions of the mobile device system 400. For example, the processor 410 may include a digital signal processor device, a microprocessor device, and various analog to digital converters, digital to analog converters, and/or other support circuits. Control and signal processing functions of the mobile device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the mobile device system 400 to transmit and receive web content, such as, for example web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless telephone network 152. In this regard, the mobile device system 400 may be configured to operate with one or more air interface standards, communication protocols, modulation types, and access types. By way of illustration, the mobile device system 400 may be configured to operate in accordance with any of a number of first, second, third, and/or fourth-generation communication protocols and/or the like. For example, the mobile device system 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 4GPP protocols and/or the like. The mobile device system 400 may also be configured to operate in accordance with non-cellular communication mechanisms, such as via a wireless local area network (WLAN) or other communication/data networks. Of course, the network interface 460 may also comprise a wireline connection to at least a portion of the network 150.

As described above, the mobile device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410. The user input devices 440, which allow the mobile device system 400 to receive data from a user such as the user 110, may include any of a number of devices allowing the mobile device system 400 to receive data from the user 110, such as a keypad, keyboard, touch-screen, touchpad, microphone, mouse, joystick, other pointer device, button, soft key, and/or other input device(s). The user interface may also include a camera 470, such as a digital camera.

The mobile device system 400 further includes a power source 415, such as a battery or power line, for powering various circuits and other devices that are used to operate the mobile device system 400. Embodiments of the mobile device system 400 may also include a clock or other timer 450 configured to determine and, in some cases, communicate actual or relative time to the processor 410 or one or more other devices.

The mobile device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the mobile device system 400 and/or one or more of the process/method steps described herein. For example, the memory 420 may include such applications as a resource tracking application 421, a conventional web browser application 422, a resource scanning application 423, and/or an object recognition application 424. These applications also typically provide a graphical user interface (GUI) on the display 430 that allows the first user 110 to communicate with the managing entity system 200, the ATM system 300, other mobile device systems 400, the merchant system 500, the financial center system 160, and/or a third party system 170.

The memory 420 can also store any of a number of pieces of information, and data, used by the mobile device system 400 and the applications and devices that make up the mobile device system 400 or are in communication with the mobile device system 400 to implement the functions of the mobile device system 400 and/or the other systems described herein. For example, the memory 420 may include such data as user authentication information, and the like.

The resource tracking application 421 of the memory 420 may comprise instructions for causing components of the mobile device system 400 to perform certain functions that relate to transactions, savings, accounting, and other financial actions. For example, the resource tracking application 421 may cause the user output devices 436 to output certain information to a user (e.g., the user 110) and/or allow a user to input information regarding a financial transaction by using the user input devices 440. The resource tracking application 421 may cause one or more components of the mobile device system 400 to measure (e.g., scan) and/or track bank notes and/or coins provided by the user, and store this information in the memory 420 for later use.

The object recognition application 424 may instruct one or more components of the mobile device system 400 to detect, measure, analyze, or otherwise identify information found on (or associated with) bank notes and/or coins provided by the user. For example, the object recognition application 424 may cause the camera 470 to acquire an image of a received bank note, where the image can then be analyzed by the object recognition application 424 to identify one or more useful features of the received bank note. In some embodiments, the object recognition application 424 and/or the resource tracking application 421 may be configured to identify denominations of received currency, serial numbers of received currency, and/or make determinations on the validity of received currency.

The resource scanning application 423 of the memory 420 may be configured to provide instructions to components of the mobile device system 400 for collecting, scanning, and/or tracking one or more bank notes, coins, other currency, or other important documents. For example, the resource scanning application 423 may cause the camera 470 to scan one or more bank notes (e.g., as a user receives the currency, while the user has possession of the currency, and/or as the user transfers the currency), to store information from the scan within the memory 420, and/or transmit the scan to the managing entity system 200 so the managing entity system 200 can monitor the mobile device system 400 as a node in a resource network.

FIG. 5 provides a block diagram illustrating the merchant system 500 of FIG. 1B in greater detail, in accordance with embodiments of the invention. As illustrated in FIG. 5, and in one embodiment of the invention, the merchant system 500 includes one or more processing devices 520 operatively coupled to a network communication interface 510 and a memory device 530. In certain embodiments, the merchant system 500 is operated by a managing entity, such as a financial institution, while in other embodiments, the merchant system 500 is operated by an entity other than a financial institution.

It should be understood that the memory device 530 may include one or more databases, datastores, or other data structures/repositories. The memory device 530 also includes computer-executable program code that instructs the processing device 520 to operate the network communication interface 510 to perform certain communication functions of the merchant system 500 described herein. For example, in one embodiment of the merchant system 500, the memory device 530 includes, but is not limited to, a network server application 540, resource scanning application 550 that includes denomination data 552 and serial number data 554 associated with that merchant system 500. In some embodiments, each distinct merchant system 500 scans and records the denomination data 552, serial number data 554, and other identifiable information of received bank notes within its own memory device 530.

In one embodiment, the resource scanning application 550 includes denomination data 552, serial number data 554, and other nodal data 556. The denomination data 552 may comprise any information associated with techniques for identifying a denomination of a currency. For example, the denomination data 552 may comprise information about sizes, weights, coloring, physical features, artistic features, numerical features, and the like for each denomination of any number of currencies (including foreign currencies). In this way, the merchant system 500 may be able to compare an input of received currency characteristics with the denomination data 552 to determine a denomination of the currency.

Similarly, the serial number data 554 may comprise a datastore of one or more known serial numbers of acquired currency, or currency once acquired. For example, the merchant system 500 may store any identified serial number data 554 within the resource scanning application 550.

The denomination data 552 and/or the serial number data 554 may additionally be related to nodal data associated with the merchant system 500. In some embodiments, the nodal data is stored within the memory device 530 of the merchant system 500. Additionally or alternatively, and as described above, the nodal data may be stored in the memory device 230 of the managing entity system 200. This information about a nodal system may comprise location information for the merchant system 500, total value of bank notes or other cash stored at the merchant system 500, quantities of one or more denominations of bank notes for the merchant system 500, historical data for the merchant system 500, trend information for the merchant system 500, and the like. In this way, the merchant system 500 may be able to identify a serial number for each item of currency (i.e., each bank note) that it has in possession within the merchant system 500.

Referring now to FIG. 6, a flowchart is provided to illustrate one embodiment of a process 600 for providing on-demand resource delivery to resource dispensers, in accordance with embodiments of the invention. In some embodiments, the process 600 may include block 602, where the system continuously monitors a plurality of resource notes at a plurality of nodes across a physical geographic region. As described above, the system may monitor interactions across multiple nodes that make up a nodal network of one or more geographic regions.

Additionally, and as described above, the term "node" may refer to any device, branch, entity, grouping of devices, branches, or entities, and the like within a geographic region. For example, the system may be associated with a nodal network made up of one or more automated teller machines, point of sale devices, mobile devices associated with users, delivery vehicles, merchant stores or locations, electronic safes, cash vaults, other resource inventory locations, and/or the like. As described above, the system may monitor interactions across multiple nodes that make up a nodal network of one or more geographic regions.

Additionally, and as described above, the term "node" may refer to any device, branch, entity, grouping of devices, branches, or entities, and the like within a geographic region. For example, the system may be associated with a nodal network made up of one or more automated teller machines (ATMs), point of sale devices, mobile devices associated with users, delivery vehicles, merchant stores or locations, and/or the like. Therefore, the plurality of nodes at which the plurality of resource notes are monitored may comprise a local (e.g., city-wide) network of ATMs, financial institution branches, point of sale devices, merchant systems, delivery vehicles (e.g., armored delivery trucks or vans), and the like. Additionally or alternatively, the plurality of nodes may comprise or represent a much larger region (e.g., a region of a state, a region of a country, a region comprising at least portions of multiple countries, and the like).

The resource notes that are monitored within and across the plurality of nodes in this geographic region may comprise bank notes, checks, financial bonds, important documents or items, coins, or other currency or currency-based items.

As shown in FIG. 6, the continuously monitoring step of block 602 may further comprise block 604, block 606, and block 608. As such, in some embodiments, the process 600 includes block 604, where the system determines when each of the plurality of resource notes are received at each of the plurality of resource nodes and scans each resource note for denomination data in real-time as each resource note is received. In this way, the system is able to detect and identify resource notes (e.g., bank notes) as they are received at an ATM, a financial center, a delivery vehicle, a merchant location of a merchant system, or any other node within a monitored nodal network. Of course, in some embodiments, the resource notes are not identified immediately, but are processed in batches periodically (e.g., every hour, every few hours, every day, and the like). However, by immediately determining when the plurality of resources are received (e.g., by scanning the resource notes as they are received), and identifying information about the resource notes (e.g., the denomination data about each resource notes) in real-time, the system is able to better track and account for the location and flow of resource notes within the overall nodal network.

The system may determine that a resource note is being received, or has been received, at a node by a detection from a detection device (e.g., a scanner, a scale, a camera, a cash deposit slot scanner, a point of sale device cash scanner, a self-checkout device cash scanner, and the like). As the resource note is detected, the system may immediately (or nearly immediately) cause a component device of the node to scan the received resource note for denomination data in real-time (or in near real-time). The denomination data associated with the resource note may be a reference to a value of that individual resource note (e.g., a cash value, a bond value, and the like). By identifying denomination data for each resource note that is being received or dispensed at each node, the system can ascertain total values of the resource notes currently (or expected to be) held at each node at any point in time.

In some such embodiments, the system may also identify a unique identifier that is associated with one or more unique characteristics of each received resource note and/or denomination data associated with each received resource note. For example, the unique identifier may be a unique serial number assigned to and already present on the resource note (e.g., a serial number placed on a bank note by the mint or treasury that generated the bank note). In another example, the unique identifier may be a security feature of the resource note, or at least a component of a security feature of the resource note. For example, the unique identifier may be incorporated in a water mark, an electromagnetic signal embedded within (or attached to) the resource note, a bar code affixed to the resource note, and the like.

In some embodiments, the received resource note may not include or comprise a unique identifier. In such cases, the managing entity of the system may affix (or instruct a merchant or other nodal system of the overall nodal network system to affix) a new unique identifier on the resource note.

By scanning and identifying unique identifiers as they are received by nodes of the nodal network, the system can determine when, how, and where each resource note has reached a destination, has been dispensed, has been used for payment, and the like. Additional information can be scanned or otherwise identified along with the unique identifier (or incorporated along with the scanned information about the unique identifier). For example, the system may time-stamp each scan of the resource note, identify a denomination of the resource note, and the like, and combine or otherwise reference the time information, the denomination information, information about the receiving node (e.g., a name of the node, a nodal type, a geographic location of the node, and the like), and other relevant information with the unique identifier for future reference.

Additionally, in some embodiments, the process 600 includes block 606, where the system determines when each of the plurality of resource notes are deposited at each of the plurality of nodes and scans each resource note for denomination data in real-time as each resource note is deposited. In this way, the system is able to detect and identify resource notes (e.g., bank notes) as they are withdrawn from (or otherwise dispensed by) an ATM, a financial center, a delivery vehicle, a merchant location of a merchant system, or any other node within a monitored nodal network. By immediately determining when each of the plurality of resources are dispensed (e.g., by scanning the resource notes as they are withdrawn from a node), and identifying information about the resource notes (e.g., the denomination data) in real-time, the system is able to better track and account for the location and flow of resource notes within the overall nodal network.

The system may determine that a resource note is being withdrawn, or has been withdrawn, at a node by a detection from a detection device (e.g., a scanner, a scale, a camera, a cash deposit slot scanner, a point of sale device cash scanner, a self-checkout device cash scanner, and the like). As the resource note is detected, the system may immediately (or nearly immediately) cause a component device of the node to scan the resource note for denomination data in real-time (or in near real-time).

The process 600 may also include block 608, where the system stores monitored data for each of the plurality of nodes in a resource grid database. The monitored data may comprise any data and/or information associated with the monitored nodes, the resource notes being identified and scanned at each of the nodes, and the like. For example, the monitored data may include, but is not limited to, nodal location data, time data associated with the received and dispensed resource notes, unique identifier data for each of the received and dispensed resource notes, and denomination data for each of the plurality of the received and dispensed resource notes.

This monitored data may be transmitted to, and stored in, a centralized resource grid database, where the managing entity can control, review, analyze, and otherwise monitor the monitored data in real-time as the data is acquired. The managing entity can also analyze historical monitored data in the resource grid database to identify trends, predict future flow of resource notes throughout the nodal grid, and the like.

Additionally or alternatively, at least some of the monitored data may be stored on local nodal databases that are in network communication with a managing entity system, such that the managing entity system can either receive data feeds form the local nodal databases in real-time (or near real-time), or the managing entity system can reach out to these remote nodal databases to review, analyze, extract, or otherwise monitor the data stored in the remote local nodal databases.

In some embodiments, the process 600 includes block 610, where the system determines, based on the stored monitored data, that a first node of the plurality of nodes requires an adjustment of an amount of resource notes present at the first node. The adjustment referenced here may be a need for an increase in quantity and/or value of resource notes at the node. For example, a node may wish (or be required) to have a certain amount of resource notes available at any time, sometimes including specific quantities of one or more denominations of the resource notes. Therefore, when the resource notes at the node fall below a specific threshold value at the first node, the system may determine that an adjustment to increase the quantity of resource notes at the first node is needed.

Alternatively, the adjustment may be a need for a decrease in quantity and/or value of resource notes at the node. For example, a node may wish (or be required) to not have more than a certain value, number, weight, or other quantity of resource notes at its location at any one point in time. Therefore, when the system determines that the quantity, value, and the like has met some predetermined threshold value or percentage near the maximum limit, the system may make the determination that an adjustment to reduce the quantity of resource notes at the first node is needed.

In some embodiments of the invention, the system may also provide predictive analytics, in some cases utilizing machine-based learning, to plan for future delivery of resources to one or more nodes at some future point in time, or over some future period of time. For example, the system may identify or determine a trend of an amount of resource notes that are present at one or more nodes over a certain period of time. This trend may be determined through an analysis at each node regarding historical total amounts of resource notes at the node, historical total values of resource notes at the node, historical total quantities for each denomination of resource note, and the like, over multiple periods of time. The system may then use regression analysis to extrapolate expected amounts or values of the resource notes at one or more future points in time.

As such, the system may then determine, based on one or more trends, a predicted amount of the plurality of resource notes that are expected to be present at each of the one or more nodes at a future point in time. This understanding can aid the system in predicting and resolving potential cash flow, bank note flow, quantities of resource notes at certain nodes, and the like over time throughout the entire nodal network.

As touched on before, this predicted amount of resource notes that are expected to be present at a specific node can be compared to a minimum and/or a maximum threshold amount of resource notes for that specific node. If the predicted amount of resource notes that are expected to be present at the specific node is below the minimum threshold, then the system can determine that instructions should be sent to a delivery vehicle to provide additional resource notes to that specific node prior to the future point in time. Alternatively, if the predicted amount of resource notes that are expected to be present at the specific node is above the maximum threshold, then the system can determine that instructions should be sent to a delivery vehicle to reduce or otherwise extract resource notes from the specific node prior to the future point in time.

Finally, the process 600 may continue to block 612, where the system transmits an instruction to cause a delivery vehicle to provide the adjustment to the amount of resource notes present at the first node. As the type of delivery vehicle(s) used to transfer resource notes between nodes can vary, so too can the type of instructions that are sent to the delivery vehicle. For example, in embodiments where the delivery vehicle is an armored van, the system may transmit a signal to a user interface or other dashboard in the armored van to display transaction amounts, resource note quantities, GPS coordinates of the nodes, quantity and/or amount of resource notes that are to be transferred, and the like. In such embodiments, an armored van driver can view these instructions and carry out the transaction.

In embodiments where the delivery vehicle includes automated transferring devices (e.g., ATMs, logistic conveyor belts in a storage center, and the like), the instructions transmitted by the system may be computer readable instructions for causing the automated transferring devices to perform one or more functions of a delivery vehicle system. For example, the system could instruct an ATM to dispense a certain amount of resource notes into a depository for future pickup. In another example, an automated forklift may be instructed to retrieve a container of resource notes in a warehouse and automatically transfer the container of resource notes to a specific delivery vehicle (e.g., an armored van like the one described above, a cargo plane, a cargo train, a cargo ship, and the like).

In some embodiments, the system will determine that an additional amount of resource notes need to be added to a first node. In such embodiments, the system may also determine, based on the stored monitored data, that a second node of the plurality of nodes requires a reduction of an amount of resource notes present at the second node. This determination that the second node requires a reduction of notes present can be determined in the same manner as with the first node (e.g., the continuous monitoring of resource notes and nodes across the nodal network in real-time).

In response to determining both that (i) the first node requires a delivery of an additional amount of resource notes and (ii) that the second node requires the reduction of the amount of resource notes present at the second node, the system can address both issues with a single set of instructions to a delivery vehicle. For example, the system could transmit an instruction to cause the delivery vehicle to reduce the amount of resource notes present at the second node and provide the additional amount of resource notes to be added to the first node.

Of course, the opposite scenario is also possible, where the first node is determined to require a reduction in the amount of resource notes and the second node is determined to require an additional amount of resource notes. In such cases, the instructions would cause the delivery vehicle to extract resource notes from the second node and transfer at least a portion of those extracted resource notes to the first node.

In this way, the system can identify and address multiple problems affecting the health of the resource grid network in real-time. Furthermore, by identifying both a node comprising (or on track to comprise) too many resource notes and a node comprising (or on track to comprise) too few resource notes, the system is able to resolve both issues with a single creation or adjustment of a delivery route.

In some embodiments, the system may be able to identify a need for an additional node to be present in a specific geographic area within the nodal network. For example, the system may review the historical monitored data for multiple ATM nodes in a given region, determine that these ATM nodes are having issues with meeting the demand for resource notes at their respective locations, and identify a location central (or logistically helpful) to those multiple ATM nodes that a new ATM node could be placed.

Of course, the system could also determine that one or more nodes are unnecessary or are not efficient within the nodal network based on the historical monitored data. In such embodiments, the system could determine that these one or more nodes should be removed to improve the health of the surrounding nodes and the overall nodal network.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

To supplement the present disclosure, this application further incorporates entirely by reference the following commonly assigned patent applications:

| Docket Number | U.S. patent application Ser. No. | Title | Filed On |
| --- | --- | --- | --- |
| 7637US1.014033.2980 | 15/598,574 now published as U.S. | RESOURCE GRID SYSTEM FOR TRACKING AND | May 18, 2017 |

-continued

| Docket Number | U.S. patent application Ser. No. | Title | Filed On |
|---|---|---|---|
| 7639US1.014033.2975 | Patent Publication No. 2018/0336508 15/598,597 now U.S. Pat. No. 10,275,972 | RECONCILING RESOURCE MOVEMENT SYSTEM FOR GENERATING AND PROVIDING SEALED CONTAINERS OF TRACEABLE RESOURCES | May 18, 2017 |
| 7640US1.014033.2979 | 15/598,583 now U.S. Pat. No. 10,217,084 | SYSTEM FOR PROCESSING RESOURCE DEPOSITS | May 18, 2017 |
| 7785US1.014033.3015 | 15/599,124 now U.S. Patent Publication No. 2018/0336536 | SYSTEM FOR PROVIDING REAL-TIME TRACKING OF INDIVIDUAL RESOURCE ITEMS TO IDENTIFY SPECIFIC RESOURCE TRANSFERS | May 18, 2017 |
| 7796US1.014033.3018 | 15/599,129 now U.S. Patent Publication No. 2018/0336555 | SYSTEM FOR PROVIDING REAL-TIME TRACKING OF INDIVIDUAL RESOURCE ITEMS TO IDENTIFY UNAUTHORIZED RESOURCE TRANSFERS | May 18, 2017 |
| 7800US1.014033.3016 | 15/598,589 now U.S. Patent Publication No. 2018/0336538 | SYSTEM FOR PROCESSING DEPOSIT OF RESOURCES WITH A RESOURCE MANAGEMENT SYSTEM | May 18, 2017 |

The invention claimed is:

1. A system for providing on-demand resource delivery to resource dispensers, the system comprising:

a memory device; and one or more processing devices operatively coupled to the memory device, wherein the one or more processing devices are configured to execute computer-readable program code to:

monitor, continuously, a plurality of sets of resource notes at a plurality of nodes across a physical geographic region, wherein each of the plurality of sets of resource notes are within physical containers each comprising an associated unique identifier tag, and wherein monitoring comprises:

scanning the associated unique identifier tag for each of the plurality of sets of resource notes received to determine, based on the associated unique identifier tag for each of the plurality of sets of resource notes, denomination data associated with each of the plurality of sets of resource notes in real-time as they are received;

determining when each of the plurality of sets of resource notes are dispensed from each of the plurality of nodes and automatically scanning the associated unique identifier tag for each of the plurality of sets of resource notes to determine the denomination data associated with each of the plurality of sets of resource notes in real-time as they are dispensed, wherein determining the denomination data associated with an individual set of resource notes of the plurality of sets of resource notes at an individual node of the plurality of nodes comprises:

receiving an indication that a first entity associated with the individual node has scanned a unique identifier tag associated with the individual set of resource notes;

in response to receiving the indication that the unique identifier tag associated with the individual set of resource notes has been scanned, transmitting a deposit alert over a communication channel to a computing device of the first entity, wherein the deposit alert activates a deposit application stored on the computing device of the first entity to display a deposit portal comprising input fields and a request for the first entity to provide entity input associated with contents of the container that includes the denomination data associated with the individual set of resource notes; and receiving, from the computing device of the first entity, the entity input associated with the contents of the container and associating the denomination data associated with the individual set of resource notes with the unique identifier for the individual set of resource notes; and storing monitored data for each of the plurality of nodes in a resource grid database, wherein the stored monitored data comprises nodal location data, time data associated with each of the plurality of sets of resource notes that are received and dispensed at each of the plurality of nodes, and the denomination data for each of the plurality of the received and the dispensed sets of resource notes;

determine, based on the stored monitored data, that a first node of the plurality of nodes requires an adjustment of an amount of resource notes present at the first node;

transmit, in response to determining that the first node requires the adjustment of the amount of resource notes present at the first node, an instruction to cause a delivery vehicle to provide the adjustment to the amount of resource notes present at the first node;

determine a trend of the amount of resource notes that are present at the first node over a period of time;

determine, based on the trend, a predicted amount of resource notes that are expected to be present at the first node at a future point in time; and determine that the predicted amount of resource notes that are expected to be present at the first node at the future point in time is below or above a threshold amount of resource notes.

2. The system of claim 1, wherein transmitting the instruction to cause the delivery vehicle to provide the adjustment to the amount of resource notes comprises instructions to provide the adjustment before the future point in time.

3. The system of claim 1, wherein providing the adjustment to the amount of resource notes present at the first node comprises providing an additional amount of resource notes to be added to the first node.

4. The system of claim 3, wherein the one or more processing devices are further configured to execute computer-readable program code to:
determine, based on the stored monitored data, that a second node of the plurality of nodes requires a reduction of an amount of resource notes present at the second node; and
in response to determining that the first node requires the adjustment of the amount of resource notes present at the first node, and in response to determining that the second node requires the reduction of the amount of resource notes present at the second node, transmit an instruction to cause the delivery vehicle to reduce the amount of resource notes present at the second node and provide the additional amount of resource notes to be added to the first node.

5. The system of claim 1, wherein providing the adjustment to the amount of resource notes present at the first node comprises reducing the amount of resource notes at the first node.

6. The system of claim 5, wherein the one or more processing devices are further configured to execute computer-readable program code to:
determine, based on the stored monitored data, that a second node of the plurality of nodes requires an addition to an amount of resource notes to the second node; and
in response to determining that the first node requires the adjustment of the amount of resource notes present at the first node, and in response to determining that the second node requires the addition to the amount of resource notes to the second node, transmit an instruction to cause the delivery vehicle to reduce the amount of resource notes at the first node and to provide the addition to the amount of resource notes to the second node.

7. The system of claim 1, wherein each of the plurality of nodes comprise one or more automated teller machines, point of sale devices, mobile devices associated with users, delivery vehicles, or merchant locations.

8. A computer program product for providing on-demand resource delivery to resource dispensers, the computer program product comprising at least one non-transitory computer readable medium comprising computer readable instructions, the instructions comprising instructions for:
monitoring, continuously, a plurality of sets of resource notes at a plurality of nodes across a physical geographic region, wherein each of the plurality of sets of resource notes are within physical containers each comprising an associated unique identifier tag, and wherein monitoring comprises:
scanning the associated unique identifier tag for each of the plurality of sets of resource notes received to determine, based on the associated unique identifier tag for each of the plurality of sets of resource notes, denomination data associated with each of the plurality of sets of resource notes in real-time as they are received;
determining when each of the plurality of sets of resource notes are dispensed from each of the plurality of nodes and automatically scanning the associated unique identifier tag for each of the plurality of sets of resource notes to determine the denomination data associated with each of the plurality of sets of resource notes in real-time as they are dispensed, wherein determining the denomination data associated with an individual set of resource notes of the plurality of sets of resource notes at an individual node of the plurality of nodes comprises:
receiving an indication that a first entity associated with the individual node has scanned a unique identifier tag associated with the individual set of resource notes;
in response to receiving the indication that the unique identifier tag associated with the individual set of resource notes has been scanned, transmitting a deposit alert over a communication channel to a computing device of the first entity, wherein the deposit alert activates a deposit application stored on the computing device of the first entity to display a deposit portal comprising input fields and a request for the first entity to provide entity input associated with contents of the container that includes the denomination data associated with the individual set of resource notes; and
receiving, from the computing device of the first entity, the entity input associated with the contents of the container and associating the denomination data associated with the individual set of resource notes with the unique identifier for the individual set of resource notes; and
storing monitored data for each of the plurality of nodes in a resource grid database, wherein the stored monitored data comprises nodal location data, time data associated with each of the plurality of sets of resource notes that are received and dispensed at each of the plurality of nodes, and the denomination data for each of the plurality of the received and the dispensed sets of resource notes;
determining, based on the stored monitored data, that a first node of the plurality of nodes requires an adjustment of an amount of resource notes present at the first node;
transmitting, in response to determining that the first node requires the adjustment of the amount of resource notes present at the first node, an instruction to cause a delivery vehicle to provide the adjustment to the amount of resource notes present at the first node;
determining a trend of the amount of resource notes that are present at the first node over a period of time;
determining, based on the trend, a predicted amount of resource notes that are expected to be present at the first node at a future point in time; and
determining that the predicted amount of resource notes that are expected to be present at the first node at the future point in time is below or above a threshold amount of resource notes.

9. The computer program product of claim 8, wherein transmitting the instruction to cause the delivery vehicle to provide the adjustment to the amount of resource notes comprises instructions to provide the adjustment before the future point in time.

10. The computer program product of claim 8, wherein providing the adjustment to the amount of resource notes present at the first node comprises providing an additional amount of resource notes to be added to the first node.

11. The computer program product of claim 10, wherein the computer readable instructions further comprise instructions for:
  determining, based on the stored monitored data, that a second node of the plurality of nodes requires a reduction of an amount of resource notes present at the second node; and
  in response to determining that the first node requires the adjustment of the amount of resource notes present at the first node, and in response to determining that the second node requires the reduction of the amount of resource notes present at the second node, transmitting an instruction to cause the delivery vehicle to reduce the amount of resource notes present at the second node and provide the additional amount of resource notes to be added to the first node.

12. The computer program product of claim 8, wherein providing the adjustment to the amount of resource notes present at the first node comprises reducing the amount of resource notes at the first node.

13. The computer program product of claim 12, wherein the computer readable instructions further comprise instructions for:
  determining, based on the stored monitored data, that a second node of the plurality of nodes requires an addition to an amount of resource notes to the second node; and
  in response to determining that the first node requires the adjustment of the amount of resource notes present at the first node, and in response to determining that the second node requires the addition to the amount of resource notes to the second node, transmitting an instruction to cause the delivery vehicle to reduce the amount of resource notes at the first node and to provide the addition to the amount of resource notes to the second node.

14. The computer program product of claim 8, wherein each of the plurality of nodes comprise one or more automated teller machines, point of sale devices, mobile devices associated with users, delivery vehicles, or merchant locations.

15. A computer implemented method for providing on-demand resource delivery to resource dispensers, said computer implemented method comprising:
  monitoring, continuously, a plurality of sets of resource notes at a plurality of nodes across a physical geographic region, wherein each of the plurality of sets of resource notes are within physical containers each comprising an associated unique identifier tag, and wherein monitoring comprises:
    scanning the associated unique identifier tag for each of the plurality of sets of resource notes received to determine, based on the associated unique identifier tag for each of the plurality of sets of resource notes, denomination data associated with each of the plurality of sets of resource notes in real-time as they are received;
    determining when each of the plurality of sets of resource notes are dispensed at each of the plurality of nodes and automatically scanning the associated unique identifier tag for each of the plurality of sets of resource notes to determine the denomination data associated with each of the plurality of resource notes in real-time as they are dispensed, wherein determining the denomination data associated with an individual set of resource notes of the plurality of sets of resource notes at an individual node of the plurality of nodes comprises:
      receiving an indication that a first entity associated with the individual node has scanned a unique identifier tag associated with the individual set of resource notes;
      in response to receiving the indication that the unique identifier tag associated with the individual set of resource notes has been scanned, transmitting a deposit alert over a communication channel to a computing device of the first entity, wherein the deposit alert activates a deposit application stored on the computing device of the first entity to display a deposit portal comprising input fields and a request for the first entity to provide entity input associated with contents of the container that includes the denomination data associated with the individual set of resource notes; and
      receiving, from the computing device of the first entity, the entity input associated with the contents of the container and associating the denomination data associated with the individual set of resource notes with the unique identifier for the individual set of resource notes; and
    storing monitored data for each of the plurality of nodes in a resource grid database, wherein the stored monitored data comprises nodal location data, time data associated with each of the plurality of sets of resource notes that are received and dispensed at each of the plurality of nodes, and the denomination data for each of the plurality of the received and the dispensed sets of resource notes;
  determining, based on the stored monitored data, that a first node of the plurality of nodes requires an adjustment of an amount of resource notes present at the first node;
  transmitting, in response to determining that the first node requires the adjustment of the amount of resource notes present at the first node, an instruction to cause a delivery vehicle to provide the adjustment to the amount of resource notes present at the first node;
  determining a trend of the amount of resource notes that are present at the first node over a period of time;
  determining, based on the trend, a predicted amount of resource notes that are expected to be present at the first node at a future point in time; and
  determining that the predicted amount of resource notes that are expected to be present at the first node at the future point in time is below or above a threshold amount of resource notes.

16. The computer implemented method of claim 15, wherein transmitting the instruction to cause the delivery vehicle to provide the adjustment to the amount of resource notes comprises instructions to provide the adjustment before the future point in time.

17. The computer implemented method of claim 15, wherein each of the plurality of nodes comprise one or more automated teller machines, point of sale devices, mobile devices associated with users, delivery vehicles, or merchant locations.

* * * * *